United States Patent
Zhu et al.

(10) Patent No.: US 9,904,986 B2
(45) Date of Patent: Feb. 27, 2018

(54) IMAGE DENOISING METHOD AND TERMINAL

(71) Applicant: HUAWEI DEVICE (DONGGUAN) CO., LTD., Dongguan (CN)

(72) Inventors: Congchao Zhu, Beijing (CN); Wei Luo, Shanghai (CN); Xiaowei Yang, Hangzhou (CN); Bin Deng, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 15/033,550

(22) PCT Filed: Nov. 6, 2014

(86) PCT No.: PCT/CN2014/090421
§ 371 (c)(1),
(2) Date: Apr. 29, 2016

(87) PCT Pub. No.: WO2015/067186
PCT Pub. Date: May 14, 2015

(65) Prior Publication Data
US 2016/0284067 A1   Sep. 29, 2016

(30) Foreign Application Priority Data

Nov. 8, 2013   (CN) .......................... 2013 1 0554182

(51) Int. Cl.
*G06T 5/00* (2006.01)
*G06T 5/10* (2006.01)
*G06T 5/20* (2006.01)

(52) U.S. Cl.
CPC ............... *G06T 5/002* (2013.01); *G06T 5/10* (2013.01); *G06T 5/20* (2013.01);
(Continued)

(58) Field of Classification Search
CPC .. G06T 5/002; G06T 5/10; G06T 5/20; G06T 2207/10024; G06T 2207/20016; G06T 2207/20064; G06T 2207/20192
See application file for complete search history.

(56) References Cited

U.S. PATENT DOCUMENTS

| 8,457,433 B2 | 6/2013 | Hong |
| 2010/0008574 A1 | 1/2010 | Ishiga |

(Continued)

FOREIGN PATENT DOCUMENTS

| CN | 101561925 A | 10/2009 |
| CN | 101719267 A | 6/2010 |

(Continued)

OTHER PUBLICATIONS

Chang, S., et al., "Spatial Adaptive Wavelet Thresholding for Image Denosing," Proceedings / International Conference on Image Processing, Oct. 26, 1997, pp. 374-377.

(Continued)

Primary Examiner — Edward Park
(74) Attorney, Agent, or Firm — Conley Rose, P.C.

(57) ABSTRACT

An image denoising method and terminal, where the method includes acquiring image data of an image, performing wavelet decomposition on at least one component of three components of the image data to obtain a high frequency wavelet coefficient and a low frequency wavelet coefficient of each component, performing recursive denoising on the low frequency wavelet coefficient of each component in at least one direction, to obtain a denoised low frequency wavelet coefficient of each component, performing wavelet reconstruction according to the high frequency wavelet coefficient of each component and the denoised low frequency wavelet coefficient of each component, to obtain at least one denoised component, and obtaining denoised image data.

19 Claims, 6 Drawing Sheets

(52) U.S. Cl.
CPC ............... *G06T 2207/10024* (2013.01); *G06T 2207/20016* (2013.01); *G06T 2207/20064* (2013.01); *G06T 2207/20192* (2013.01)

(56) References Cited

U.S. PATENT DOCUMENTS

| | | |
|---|---|---|
| 2010/0309344 A1 | 12/2010 | Zimmer et al. |
| 2011/0002384 A1 | 1/2011 | Mallat et al. |
| 2011/0182510 A1 | 7/2011 | Hong |
| 2012/0307110 A1 | 12/2012 | Baqai et al. |
| 2013/0071025 A1 | 3/2013 | Jang et al. |
| 2014/0345399 A1 | 11/2014 | Chadda et al. |

FOREIGN PATENT DOCUMENTS

| | | | |
|---|---|---|---|
| CN | 101882305 | A | 11/2010 |
| CN | 101944230 | A | 1/2011 |
| CN | 102332155 | A | 1/2012 |
| EP | 1519564 | B1 | 1/2010 |
| JP | 2006309749 | A | 11/2006 |
| JP | 2007316983 | A | 12/2007 |
| JP | 2013065302 | A | 4/2013 |
| JP | 2016524563 | A | 8/2016 |

OTHER PUBLICATIONS

Rai, R., et al., "Review of Shrinkage Techniques for Image Denoising," International Journal of Computer Applications 0975-8887, vol. 42, No. 19, Mar. 2012, pp. 13-16.

Foreign Communication From a Counterpart Application, European Application No. 14860150.3, Extended European Search Report dated Oct. 14, 2016, 10 pages.
Foreign Communication From a Counterpart Application, PCT Application No. PCT/CN2014/090421, English Translation of International Search Report dated Feb. 11, 2015, 2 pages.
Foreign Communication From a Counterpart Application, PCT Application No. PCT/CN2014/090421, English Translation of Written Opinion dated Feb. 11, 2015, 6 pages.
Machine Translation and Abstract of Chinese Publication No. CN101882305, Nov. 10, 2010, 10 pages.
Machine Translation and Abstract of Chinese Publication No. CN101944230, Jan. 12, 2011, 8 pages.
Machine Translation and Abstract of Chinese Publication No. CN102332155, Jan. 25, 2012, 8 pages.
Machine Translation and Abstract of Japanese Publication No. JP2006309749, Nov. 9, 2006, 49 pages.
Machine Translation and Abstract of Japanese Publication No. JP2007316983, Dec. 6, 2007, 19 pages.
Foreign Communication From a Counterpart Application, Chinese Application No. 201310554182.2, Chinese Office Action dated Apr. 19, 2017, 4 pages.
Foreign Communication From a Counterpart Application, Chinese Application No. 201310554182.2, Chinese Search Report dated Apr. 10, 2017, 2 pages.
Foreign Communication From a Counterpart Application, Japanese Application No. 2016-524563, Japanese Office Action dated May 8, 2017, 2 pages.
Foreign Communication From a Counterpart Application, Japanese Application No. 2016-524563, English Translation of Japanese Office Action dated May 16, 2017, 3 pages.
Foreign Communication From a Counterpart Application, Japanese Application No. 2016-524563, Japanese Notice of Allowance dated Aug. 22, 2017, 1 page.

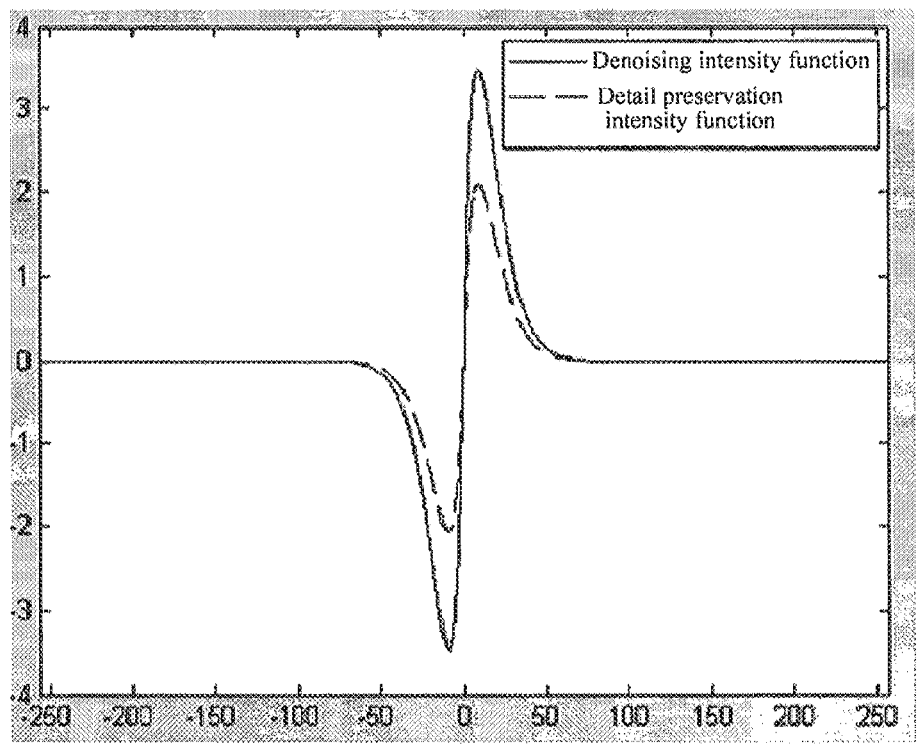
FIG. 6
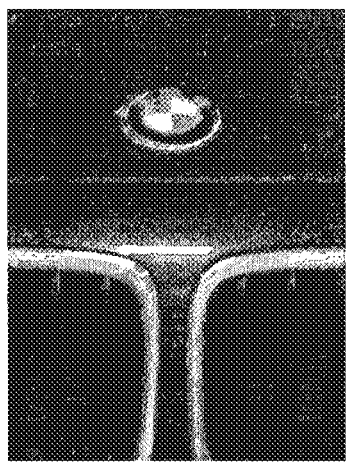 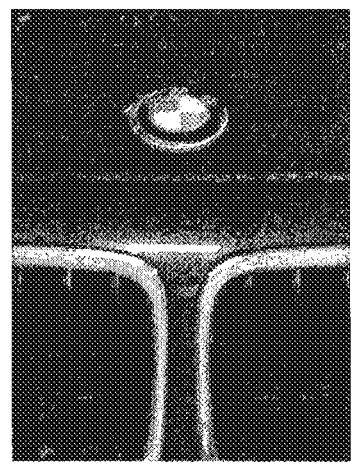 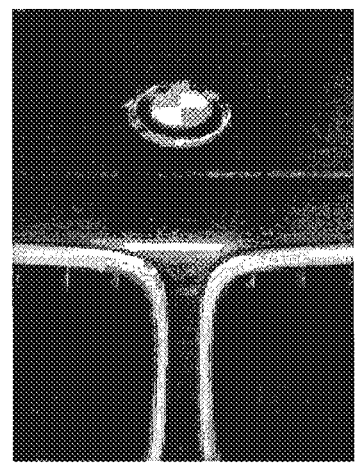
FIG. 7A  FIG. 7B  FIG. 7C

IMAGE DENOISING METHOD AND TERMINAL

CROSS-REFERENCE TO RELATED APPLICATIONS

This application is a U.S. National Stage of International Application No. PCT/CN2014/090421, filed on Nov. 6, 2014, which claims priority to Chinese Patent Application No. 201310554182.2, filed on Nov. 8, 2013, both of which are hereby incorporated by reference in their entireties.

TECHNICAL FIELD

The present disclosure relates to the field of image processing, and in particular, to an image denoising method and terminal.

BACKGROUND

In order to resolve a problem of image noise, a large number of image denoising algorithms emerge in the industry, for example, a window filtering method unrelated to image content and a non-local means algorithm based on image structure similarity analysis.

The window filtering method unrelated to image content requires a small amount of calculation, but incurs a severe loss of image details. The non-local means algorithm based on image structure similarity analysis performs well in terms of detail preservation and color protection, but the algorithm is highly complex and has low efficiency. Therefore, a contradiction between a denoising effect and efficiency is more obvious.

SUMMARY

Embodiments of the present disclosure provide an image denoising method and terminal, which can improve a denoising effect and efficiency of image denoising.

According to a first aspect, an embodiment of the present disclosure provides an image denoising method, where the method includes acquiring image data of an image, performing wavelet decomposition on at least one component of three components of the image data: a luminance component y and chrominance components u and v, to obtain a high frequency wavelet coefficient and a low frequency wavelet coefficient of each component, performing recursive denoising on the low frequency wavelet coefficient of each component, to obtain a denoised low frequency wavelet coefficient of each component, performing wavelet reconstruction according to the high frequency wavelet coefficient of each component and the denoised low frequency wavelet coefficient of each component, to obtain at least one denoised component, and when the at least one denoised component is three components, combining the three denoised components to obtain denoised image data, or combining the at least one denoised component with the other one or two components of the three components to obtain denoised image data when at least one denoised component is one or two components.

With reference to the first aspect, in a first implementation manner of the first aspect, the method further includes performing shrinkage function denoising on the high frequency wavelet coefficient of each component based on edge information, where the performing shrinkage function denoising on the high frequency wavelet coefficient of each component based on edge information includes performing denoising on the high frequency wavelet coefficient of each component according to the following formula:

$$y=\alpha x+(1-\alpha)h(x),$$

where $\alpha$ is a parameter related to an edge intensity, and $h(x)$ is a shrinkage function about x, and performing wavelet reconstruction according to the high frequency wavelet coefficient of each component and the denoised low frequency wavelet coefficient of each component, to obtain at least one denoised component is performing wavelet reconstruction according to a denoised high frequency wavelet coefficient of each component and the denoised low frequency wavelet coefficient of each component, to obtain the at least one denoised component.

With reference to the first aspect, in a second implementation manner of the first aspect, performing wavelet decomposition on at least one component of three components of the image data: a luminance component y and chrominance components u and v, to obtain a high frequency wavelet coefficient and a low frequency wavelet coefficient of each component includes performing n-level wavelet decomposition on the at least one component of the three components of the image data: the luminance component y and the chrominance components u and v, to obtain n levels of high frequency wavelet coefficients and n levels of low frequency wavelet coefficients of each component, where n≥2, and n is an integer, and performing recursive denoising on the low frequency wavelet coefficient of each component, to obtain a denoised low frequency wavelet coefficient of each component, and performing wavelet reconstruction according to the high frequency wavelet coefficient of each component and the denoised low frequency wavelet coefficient of each component, to obtain at least one denoised component include performing the following processing on each component.

A: performing recursive denoising on a low frequency wavelet coefficient on a $n^{th}$ level, to obtain a denoised low frequency wavelet coefficient on the $n^{th}$ level, and performing wavelet reconstruction according to the denoised low frequency wavelet coefficient on the $n^{th}$ level and a high frequency wavelet coefficient on the $n^{th}$ level, to obtain a denoised low frequency wavelet coefficient on a $(n-1)^{th}$ level.

B: performing recursive denoising on a denoised low frequency wavelet coefficient on an $i^{th}$ level, to obtain a twice-denoised low frequency wavelet coefficient on the $i^{th}$ level, where 1≤i≤n-1, i is a variable, i is an integer, and an initial value of i is n-1.

C: when i>1, performing wavelet reconstruction according to the twice-denoised low frequency wavelet coefficient on the $i^{th}$ level and a high frequency wavelet coefficient on the $i^{th}$ level, to obtain a denoised low frequency wavelet coefficient on an $(i-1)^{th}$ level, assigning a value to i such that i=i-1, and returning to step B. When i=1, performing wavelet reconstruction according to the twice-denoised low frequency wavelet coefficient on the $i^{th}$ level and a high frequency wavelet coefficient on the $i^{th}$ level, to obtain a denoised component.

With reference to the second implementation manner of the first aspect, in a third implementation manner of the first aspect, the method further includes performing shrinkage function denoising on the high frequency wavelet coefficient of each component based on edge information, where the performing shrinkage function denoising on the high frequency wavelet coefficient of each component based on edge information includes performing denoising on a high frequency wavelet coefficient on each level of the n levels of each component according to the following formula:

$$y_j = \alpha_j x_j + (1-\alpha_j)h(x_j), \text{ where } j \geq 1, \text{ and } j \text{ is an integer,}$$

where $y_j$ is a value obtained after a $j^{th}$ high frequency wavelet coefficient is denoised, $x_j$ is a value of the $j^{th}$ high frequency wavelet coefficient, $h(x_j)$ is a shrinkage function about $x_j$, and $\alpha_j$ is an edge intensity coefficient corresponding to an edge intensity of a pixel corresponding to the $j^{th}$ high frequency wavelet coefficient, where $0 \leq \alpha_j \leq 1$.

With reference to the third implementation manner of the first aspect, in a fourth implementation manner of the first aspect, performing wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level is performing wavelet reconstruction according to the denoised low frequency wavelet coefficient on the $n^{th}$ level and a denoised high frequency wavelet coefficient on the $n^{th}$ level, to obtain the denoised low frequency wavelet coefficient on the $(n-1)^{th}$ level, and performing wavelet reconstruction according to the twice-denoised low frequency wavelet coefficient on the $i^{th}$ level and a high frequency wavelet coefficient on the 1 level is performing wavelet reconstruction according to the twice-denoised low frequency wavelet coefficient on the $i^{th}$ level and a denoised high frequency wavelet coefficient on the $i^{th}$ level.

With reference to the first aspect or any one of the first, the second, the third, or the fourth implementation manner of the first aspect, in a fifth implementation manner of the first aspect, recursive denoising includes in at least one direction, a result of denoising of the $k^{th}$ low frequency wavelet coefficient=a value of the $k^{th}$ low frequency wavelet coefficient+f (a result of denoising of the $(k-1)^{th}$ low frequency wavelet coefficient the value of the $k^{th}$ low frequency wavelet coefficient), where k>1, and k is an integer, where y=f(x) is a denoising intensity function, x indicates a difference between the result of denoising of the $(k-1)^{th}$ low frequency wavelet coefficient and the $k^{th}$ low frequency wavelet coefficient, and y indicates a denoising intensity.

With reference to the fifth implementation manner of the first aspect, in a sixth implementation manner of the first aspect, the method further includes, after recursive denoising is performed on the $k^{th}$ low frequency wavelet coefficient, performing detail restoration on the $k^{th}$ low frequency wavelet coefficient according to the following formula: a result of detail restoration of the $k^{th}$ low frequency wavelet coefficient=the result of denoising of the $k^{th}$ low frequency wavelet coefficient+g (the value of the $k^{th}$ low frequency wavelet coefficient the result of denoising of the $k^{th}$ low frequency wavelet coefficient), where y=g(x) is a detail preservation intensity function, x indicates a difference between the value of the $k^{th}$ low frequency wavelet coefficient and the result of denoising of the $k^{th}$ low frequency wavelet coefficient, and y indicates a value of a detail preservation intensity.

With reference to the third or the fourth implementation manner of the first aspect, in a seventh implementation manner of the first aspect, the edge intensity of the pixel corresponding to the $j^{th}$ high frequency wavelet coefficient includes an edge intensity corresponding to the at least one component of the three components y, u, and v that correspond to the pixel corresponding to the $j^{th}$ high frequency wavelet coefficient.

With reference to the seventh implementation manner of the first aspect, in an eighth implementation manner of the first aspect, the edge intensity corresponding to the at least one component is an edge intensity based on the high frequency wavelet coefficient and the low frequency wavelet coefficient of the at least one component.

With reference to the first or the third implementation manner of the first aspect, in a ninth implementation manner of the first aspect, the shrinkage function is a wavelet threshold function, and includes at least one of the following: a hard threshold function and a soft threshold function.

With reference to the fifth implementation manner of the first aspect, in a tenth implementation manner of the first aspect, at least one direction includes at least one of the following: from left to right, from right to left, from top to bottom, and from bottom to top.

According to a second aspect, an embodiment of the present disclosure provides an image denoising terminal, where the terminal includes an image acquiring unit configured to acquire image data of an image, an image decomposition unit configured to perform wavelet decomposition on at least one component of three components of the image data: a luminance component y and chrominance components u and v, to obtain a high frequency wavelet coefficient and a low frequency wavelet coefficient of each component, an image denoising processing unit configured to perform recursive denoising on the low frequency wavelet coefficient of each component, to obtain a denoised low frequency wavelet coefficient of each component, and perform wavelet reconstruction according to the high frequency wavelet coefficient of each component and the denoised low frequency wavelet coefficient of each component, to obtain at least one denoised component, and a denoised image acquiring unit configured to combine the three denoised components to obtain denoised image data when the at least one denoised component is three components, or combine the at least one denoised component with the other one or two components of the three components to obtain denoised image data when at least one denoised component is one or two components.

With reference to the second aspect, in a first implementation manner of the second aspect, the terminal further includes an image high frequency processing unit configured to perform shrinkage function denoising on the high frequency wavelet coefficient of each component based on edge information, which includes performing denoising on the high frequency wavelet coefficient of each component according to the following formula:

$$y = \alpha x + (1-\alpha)h(x),$$

where $\alpha$ is a parameter related to an edge intensity, and $h(x)$ is a shrinkage function about x, and the image denoising processing unit being configured to perform wavelet reconstruction according to the high frequency wavelet coefficient of each component and the denoised low frequency wavelet coefficient of each component, to obtain at least one denoised component is further being configured to perform wavelet reconstruction according to a denoised high frequency wavelet coefficient of each component and the denoised low frequency wavelet coefficient of each component, to obtain the at least one denoised component.

With reference to the second aspect, in a second implementation manner of the second aspect, the image decomposition unit is further configured to perform n-level wavelet decomposition on the at least one component of the three components of the image data: the luminance component y and the chrominance components u and v, to obtain n levels of high frequency wavelet coefficients and n levels of low frequency wavelet coefficients of each component, where n≥2, and n is an integer, and the image denoising processing unit is further configured to perform the following processing on each component.

A: performing recursive denoising on a low frequency wavelet coefficient on an $n^{th}$ level, to obtain a denoised low frequency wavelet coefficient on the $n^{th}$ level, and performing wavelet reconstruction according to the denoised low frequency wavelet coefficient on the $n^{th}$ level and a high frequency wavelet coefficient on the $n^{th}$ level, to obtain a denoised low frequency wavelet coefficient on an $(n-1)^{th}$ level.

B: performing recursive denoising on a denoised low frequency wavelet coefficient on the $i^{th}$ level, to obtain a twice-denoised low frequency wavelet coefficient on the $i^{th}$ level, where 1≤i≤n−1, i is a variable, i is an integer, and an initial value of i is n−1.

C: when i>1, performing wavelet reconstruction according to the twice-denoised low frequency wavelet coefficient on the $i^{th}$ level and a high frequency wavelet coefficient on the $i^{th}$ level, to obtain a denoised low frequency wavelet coefficient on an $(i-1)^{th}$ level, assigning a value to i such that i=i−1, and returning to step B. When i=1, performing wavelet reconstruction according to the twice-denoised low frequency wavelet coefficient on the $i^{th}$ level and a high frequency wavelet coefficient on the $i^{th}$ level, to obtain a denoised component.

With reference to the second implementation manner of the second aspect, in a third implementation manner of the second aspect, the terminal further includes an image high frequency processing unit configured to perform shrinkage function denoising on the high frequency wavelet coefficient of each component based on edge information, which includes performing denoising on a high frequency wavelet coefficient on each level of the n levels of each component according to the following formula:

$$y_j = \alpha_j x_j + (1-\alpha_j)h(x_j),$$

where j≥1, and j is an integer, where $y_j$ is a value obtained after a $j^{th}$ high frequency wavelet coefficient is denoised, $x_j$ is a value of the $j^{th}$ high frequency wavelet coefficient, $h(x_j)$ is a shrinkage function about $x_j$, and $\alpha_j$ is an edge intensity coefficient corresponding to an edge intensity of a pixel corresponding to the $j^{th}$ high frequency wavelet coefficient, where $0 \leq \alpha_j \leq 1$.

With reference to the third implementation manner of the second aspect, in a fourth implementation manner of the second aspect, the image denoising processing unit being configured to perform wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level is further being configured to perform wavelet reconstruction according to the denoised low frequency wavelet coefficient on the $n^{th}$ level and a denoised high frequency wavelet coefficient on the nth level, to obtain the denoised low frequency wavelet coefficient on the $(n-1)^{th}$ level, and the image denoising processing unit being configured to perform wavelet reconstruction according to the twice-denoised low frequency wavelet coefficient on the $i^{th}$ level and a high frequency wavelet coefficient on the $i^{th}$ level is further being configured to perform wavelet reconstruction according to the twice-denoised low frequency wavelet coefficient on the $i^{th}$ level and a denoised high frequency wavelet coefficient on the $i^{th}$ level.

With reference to the second aspect, or any one of the first, the second, the third, or the fourth implementation manner of the second aspect, in a fifth implementation manner of the second aspect, recursive denoising includes in at least one direction, a result of denoising of the $k^{th}$ low frequency wavelet coefficient=a value of the $k^{th}$ low frequency wavelet coefficient+f(a result of denoising of the $(k-1)^{th}$ low frequency wavelet coefficient the value of the $k^{th}$ low frequency wavelet coefficient), where k>1, and k is an integer, where y=f(x) is a denoising intensity function, x indicates a difference between the result of denoising of the $(k-1)^{th}$ low frequency wavelet coefficient and the $k^{th}$ low frequency wavelet coefficient, and y indicates a denoising intensity.

With reference to the fifth implementation manner of the second aspect, in a sixth implementation manner of the second aspect, the terminal further includes a detail restoration unit configured to, after the image denoising processing unit performs recursive denoising on the $k^{th}$ low frequency wavelet coefficient, perform detail restoration on the $k^{th}$ low frequency wavelet coefficient according to the following formula: a result of detail restoration of the $k^{th}$ low frequency wavelet coefficient=the result of denoising of the $k^{th}$ low frequency wavelet coefficient+g (the value of the $k^{th}$ low frequency wavelet coefficient−the result of denoising of the $k^{th}$ low frequency wavelet coefficient), where y=g(x) is a detail preservation intensity function, x indicates a difference between the value of the $k^{th}$ low frequency wavelet coefficient and the result of denoising of the $k^{th}$ low frequency wavelet coefficient, and y indicates a value of a detail preservation intensity.

With reference to the third or the fourth implementation manner of the second aspect, in a seventh implementation manner of the second aspect, the edge intensity of the pixel corresponding to the $j^{th}$ high frequency wavelet coefficient includes an edge intensity corresponding to the at least one component of the three components y, u, and v that correspond to the pixel corresponding to the $j^{th}$ high frequency wavelet coefficient.

With reference to the seventh implementation manner of the second aspect, in an eighth implementation manner of the second aspect, the edge intensity corresponding to the at least one component is an edge intensity based on the high frequency wavelet coefficient and the low frequency wavelet coefficient of the at least one component.

With reference to the first or the third implementation manner of the second aspect, in a ninth implementation manner of the second aspect, the shrinkage function is a wavelet threshold function, and includes at least one of the following: a hard threshold function and a soft threshold function.

With reference to the fifth implementation manner of the second aspect, in a tenth implementation manner of the second aspect, the at least one direction includes at least one of the following: from left to right, from right to left, from top to bottom, and from bottom to top.

According to the image denoising method and terminal provided in the embodiments of the present disclosure, wavelet decomposition is performed on at least one component of three components of image data y, u, and v, and recursive denoising is performed on a low frequency wavelet coefficient of each component of the at least one component, to obtain a denoised low frequency wavelet coefficient of each component. Wavelet reconstruction is performed according to a high frequency wavelet coefficient of each component and the denoised low frequency wavelet coefficient of each component, to obtain at least one denoised component, and the three denoised components are combined to obtain denoised image data when at least one denoised component is three components, or at least one denoised component is combined with the other one or two components of the three components to obtain denoised image data when at least one denoised component is one or two components. By performing wavelet decomposition on an image and performing recursive denoising on a low frequency wavelet coefficient, an amount of data to be calculated is reduced, calculation complexity is lowered, and image denoising efficiency is improved. In addition, denoising in a recursive manner is performed using a relationship between pixels in the image, which ensures an image denoising effect.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings according to these accompanying drawings without creative efforts.

FIG. 6 is a schematic diagram of a denoising intensity function curve and a detail preservation intensity function curve in still another image denoising method according to an embodiment of the present disclosure;

FIGS. 7A, 7B, and 7C are schematic diagrams of a denoising effect of yet another image denoising method according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

Embodiment 1

Figure 1:
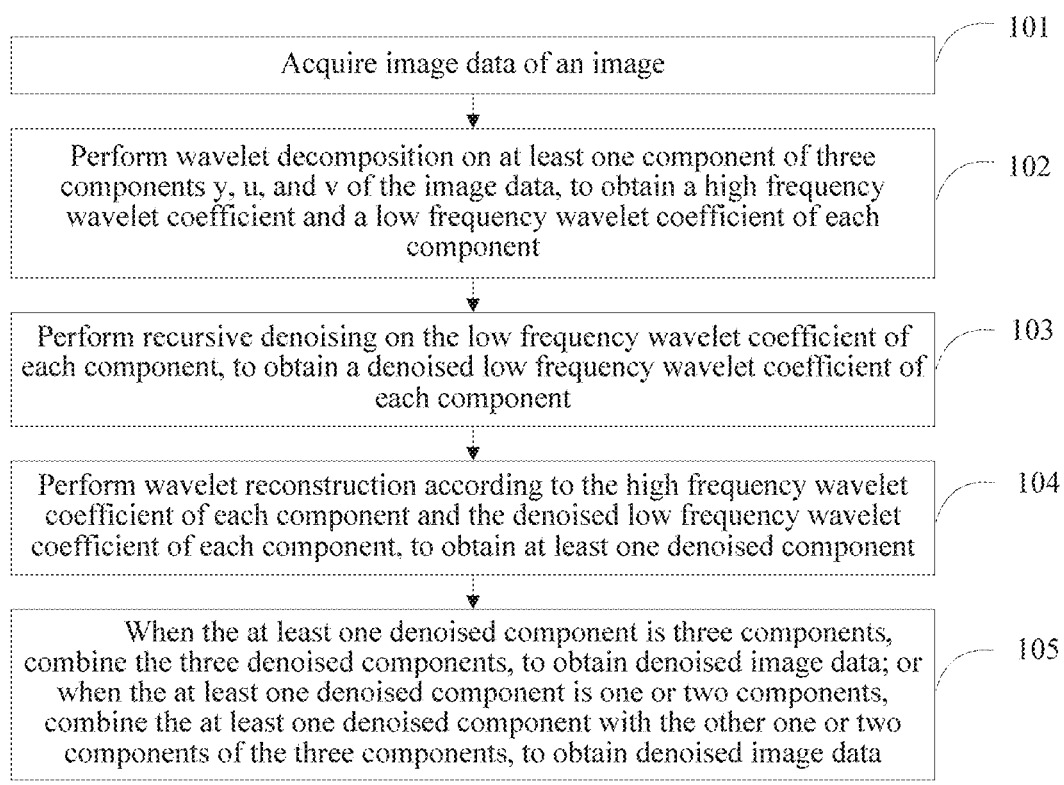
FIG. 1 is a flowchart of an image denoising method according to an embodiment of the present disclosure.

As shown in FIG. 1, in an embodiment of an image denoising method provided by the present disclosure, the method may include the following steps.

Step 101: Acquire image data of an image.

Step 102: Perform wavelet decomposition on at least one component of three components of the image data: a luminance component y and chrominance components u and v, to obtain a high frequency wavelet coefficient and a low frequency wavelet coefficient of each component.

Step 103: Perform recursive denoising on the low frequency wavelet coefficient of each component, to obtain a denoised low frequency wavelet coefficient of each component.

Step 104: Perform wavelet reconstruction according to the high frequency wavelet coefficient of each component and the denoised low frequency wavelet coefficient of each component, to obtain at least one denoised component.

Step 105: Combine the three denoised components to obtain denoised image data when at least one denoised component is three components, or combine at least one denoised component with the other one or two components of the three components to obtain denoised image data when at least one denoised component is one or two components.

For example, if the at least one denoised component is three components, that is, when three denoised components y, u, and v are obtained, the three denoised components y, u, and v are combined to obtain denoised image data. If at least one denoised component is one component, such as a component y, the denoised component y is combined with the other two components, that is, the components u and v, of the three components to obtain denoised image data. If at least one denoised component is two components, such as components y and u, the denoised components y and u are combined with the other component, that is, the component v, of the three components to obtain denoised image data.

It can be seen from the foregoing that by performing wavelet decomposition on an image and performing recursive denoising on a low frequency wavelet coefficient, an amount of data to be calculated is reduced, calculation complexity is low, and image denoising efficiency is improved. In addition, denoising in a recursive manner is performed using a relationship between pixels in the image, which ensures an image denoising effect.

Embodiment 2

Figure 2:
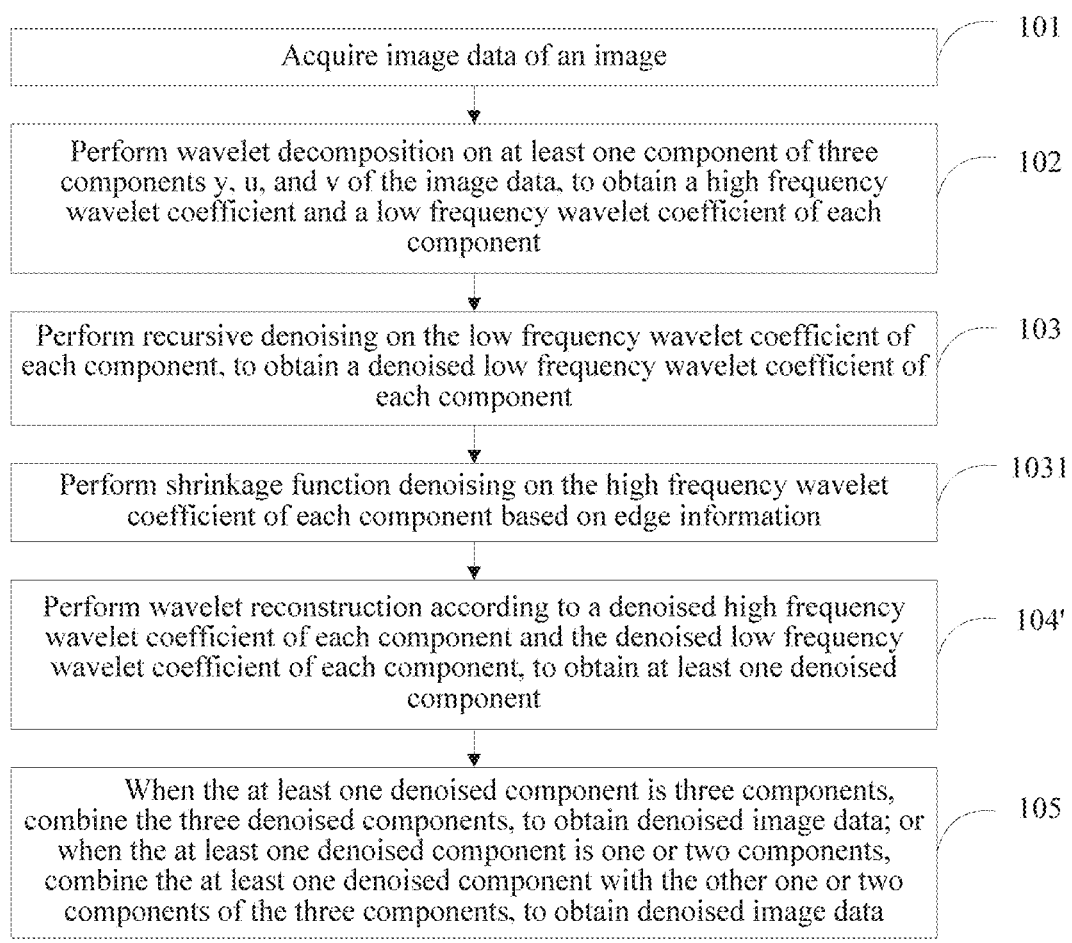
FIG. 2 is a flowchart of another image denoising method according to an embodiment of the present disclosure.

With reference to Embodiment 1, in another embodiment of the image denoising method provided by the present disclosure, as shown in FIG. 2, before step 104, the method may further include the following step.

Step 1031: Perform shrinkage function denoising on the high frequency wavelet coefficient of each component based on edge information.

The performing shrinkage function denoising on the high frequency wavelet coefficient of each component based on edge information includes performing denoising on the high frequency wavelet coefficient of each component according to the following formula:

$$y=\alpha x+(1-\alpha)h(x),$$

where α is a parameter related to an edge intensity, and h(x) is a shrinkage function about x.

In this embodiment, step 104 is step 104': Perform wavelet reconstruction according to a denoised high frequency wavelet coefficient of each component and the denoised low frequency wavelet coefficient of each component, to obtain the at least one denoised component.

Step 1031 may be performed before or after step 103, or the two steps may be simultaneously performed, which is not limited in the present disclosure.

Shrinkage function denoising is performed on a high frequency wavelet coefficient based on edge information with reference to an edge intensity of edge information of an image. Because a denoising degree varies according to edge intensity, more detail information such as edge information of the image can be preserved when denoising is performed on the high frequency wavelet coefficient. Denoising is performed on the high frequency wavelet coefficient and a low frequency wavelet coefficient using different methods with consideration of respective features of information included in the high frequency wavelet coefficient and the low frequency wavelet coefficient. For example, a high frequency part generally includes edge information. In this way, respective denoising effects of the high frequency wavelet coefficient and the low frequency wavelet coefficient are ensured, and at the same time a comprehensive denoising effect of the entire image is improved, and quality of the entire image is ensured.

Embodiment 3

With reference to Embodiment 1, in another embodiment of the image denoising method provided by the present disclosure, step 102 may include performing n-level wavelet decomposition on at least one component of the three components of the image data: the luminance component y and the chrominance components u and v, to obtain n levels of high frequency wavelet coefficients and n levels of low frequency wavelet coefficients of each component, where n≥2, and n is an integer.

Each image or picture may have three components y, u, and v. By performing denoising on a luminance component, that is, the component y, luminance noise existing in the image can be mainly removed, by performing denoising on chrominance components, that is, the components u and v, color noise existing in the image can be mainly removed. Furthermore, components to be denoised may be selected according to a type of noise existing in an image. One-level or multi-level wavelet decomposition may be performed on the at least one component of the three components y, u, and v of the image data, to obtain n levels of high frequency wavelet coefficients of each component (where there may be three high frequency wavelet coefficients on each level, which are HL, LH, and HH) and n levels of low frequency wavelet coefficients (where there may be one low frequency wavelet coefficient, which is LL, on each level). Exemplarily, a low frequency wavelet coefficient on a first level may be recorded as LL1, and high frequency wavelet coefficients on the first level may be separately recorded as: HL1, LH1, and HH1. Wavelet coefficients on other levels may be recorded by analogy.

In this embodiment, step 103 and step 104 may include performing the following processing on each component.

A: performing recursive denoising on a low frequency wavelet coefficient on the $n^{th}$ level, to obtain a denoised low frequency wavelet coefficient on the $n^{th}$ level, and performing wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level.

B: performing recursive denoising on a denoised low frequency wavelet coefficient on the $i^{th}$ level, to obtain a twice-denoised low frequency wavelet coefficient on the $i^{th}$ level, where 1≤i≤n−1, i is a variable, i is an integer, and an initial value of i is n−1.

C: when i>1, performing wavelet reconstruction according to the twice-denoised low frequency wavelet coefficient on the $i^{th}$ level and a high frequency wavelet coefficient on the $i^{th}$ level, to obtain a denoised low frequency wavelet coefficient on the $(i-1)^{th}$ level, assigning a value to i so that i=i−1, and returning to step B, or when i=1, performing wavelet reconstruction according to the twice-denoised low frequency wavelet coefficient on the $i^{th}$ level and a high frequency wavelet coefficient on the $i^{th}$ level, to obtain a denoised component.

In this embodiment of the present disclosure, wavelet decomposition is performed on image data of an image including noise, and recursive denoising is performed level by level on low frequency wavelet coefficients from the highest level to the first level of wavelet decomposition, in this way, a large area of sheet-like noise can be eliminated, and calculation complexity is low. An amount of data of a low frequency wavelet coefficient on each level in wavelet decomposition is ¼ of a total amount of data on the level. Therefore, an amount of data that needs to be processed is reduced, and efficiency is improved. In addition, a higher speed of wavelet decomposition further improves image denoising efficiency. For the large area of sheet-like noise, if denoising is performed in a conventional window filtering manner, a size of a window must be increased to more than twice a size of the noise, and calculation complexity quickly increases as the size of the window is increased. Recursive denoising used in this solution features low calculation complexity and is not affected by a size of a window, and noise is removed gradually step by step as if nibbled by a "bulldozer". The recursive denoising is performed using a relationship between low frequency wavelet coefficients (or between pixels of the image), and an effect thereof is equivalent to performing denoising using information about the entire image. Therefore, a denoising effect is improved, and quality of the image is ensured.

Embodiment 4

With reference to Embodiment 3, in another embodiment of the image denoising method provided by the present disclosure, before step 104, the method may further include the following step.

Step 1031': Perform shrinkage function denoising on the high frequency wavelet coefficient of each component based on edge information.

The performing shrinkage function denoising on the high frequency wavelet coefficient of each component based on edge information includes performing denoising on a high frequency wavelet coefficient on each level of the n levels of each component according to the following formula:

$$y_j = \alpha_j x_j + (1-\alpha_j)h(x_j),$$

where j≥1, and j is an integer, where $y_j$ is a value obtained after the $j^{th}$ high frequency wavelet coefficient is denoised, $x_j$ is a value of the $j^{th}$ high frequency wavelet coefficient, $h(x_j)$ is a shrinkage function about $x_j$, and $\alpha_j$ is an edge intensity coefficient corresponding to an edge intensity of a pixel corresponding to the $j^{th}$ high frequency wavelet coefficient, where $0 \leq \alpha_j \leq 1$. A larger edge intensity of the pixel indicates that $\alpha_j$ is closer to 1, and therefore, $y_j$ is closer to $x_j$. A smaller edge intensity indicates that $\alpha_j$ is closer to 0, and therefore, $y_j$ is closer to $h(x_j)$. $\alpha_j$ may be a value obtained after normalization processing is performed on the edge intensity of the pixel corresponding to the $j^{th}$ high frequency wavelet coefficient. When a high frequency wavelet coefficient on each level is processed, a value of j is related to a quantity of high frequency wavelet coefficients on the corresponding level.

Step 1031' may be performed before or after step 103, or the two steps may be simultaneously performed, which is not limited in the present disclosure.

Shrinkage function denoising is performed on a high frequency wavelet coefficient based on edge information with reference to an edge intensity of edge information of an image. Because a denoising degree varies according to edge intensity, more detail information such as edge information of the image can be preserved when denoising is performed on the high frequency wavelet coefficient. Denoising is performed on the high frequency wavelet coefficient and a low frequency wavelet coefficient using different methods with consideration of respective features of information included in the high frequency wavelet coefficient and the low frequency wavelet coefficient. For example, a high frequency part generally includes edge information. In this way, respective denoising effects of the high frequency wavelet coefficient and the low frequency wavelet coefficient are ensured, and at the same time a comprehensive denoising effect of the entire image is improved, and quality of the entire image is ensured.

Embodiment 5

With reference to Embodiment 4, in another embodiment of the image denoising method provided by the present disclosure, in step A, performing wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level is performing wavelet reconstruction according to the denoised low frequency wavelet coefficient on the $n^{th}$ level and a denoised high frequency wavelet coefficient on the $n^{th}$ level, to obtain the denoised low frequency wavelet coefficient on the $(n-1)^{th}$ level.

In step C, performing wavelet reconstruction according to the twice-denoised low frequency wavelet coefficient on the $i^{th}$ level and a high frequency wavelet coefficient on the $i^{th}$ level is performing wavelet reconstruction according to the twice-denoised low frequency wavelet coefficient on the $i^{th}$ level and a denoised high frequency wavelet coefficient on the $i^{th}$ level.

Embodiment 6

With reference to any one of Embodiment 1 to Embodiment 5, in another embodiment of the image denoising method provided by the present disclosure, recursive denoising may include in at least one direction, a result of denoising of the $k^{th}$ low frequency wavelet coefficient=a value of the $k^{th}$ low frequency wavelet coefficient+f (a result of denoising of the $(k-1)^{th}$ low frequency wavelet coefficient the value of the $k^{th}$ low frequency wavelet coefficient), where k>1, and k is an integer, where y=f(x) is a denoising intensity function, x indicates a difference between the result of denoising of the $(k-1)^{th}$ low frequency wavelet coefficient and the $k^{th}$ low frequency wavelet coefficient, and y indicates a denoising intensity.

Several denoising intensities, that is, different denoising grades, of the image may be obtained based on a predetermined rule according to an estimated noise level of the image, or a system presets or a user sets different denoising grades. The denoising intensity function is a function determined according to the estimated noise level of the image and/or a setting of a user for the function.

The recursive denoising may be understood as follows. For each low frequency wavelet coefficient, in at least one direction, if there is a previous low frequency wavelet coefficient of the low frequency wavelet coefficient, calculating a denoised value of the low frequency wavelet coefficient according to a denoised value of the previous low frequency wavelet coefficient.

For a first low frequency wavelet coefficient in one direction, there is no previous low frequency wavelet coefficient for reference, a result of denoising of the first low frequency wavelet coefficient may be a value of the low frequency wavelet coefficient, or a value obtained after a value of the low frequency wavelet coefficient is denoised using a denoising algorithm. The denoising algorithm may be an existing denoising algorithm, which is not limited in the present disclosure.

Embodiment 7

With reference to Embodiment 6, in another embodiment of the image denoising method provided by the present disclosure, the method may further include, after recursive denoising is performed on the $k^{th}$ low frequency wavelet coefficient, performing detail restoration on the $k^{th}$ low frequency wavelet coefficient according to the following formula a result of detail restoration of the $k^{th}$ low frequency wavelet coefficient=the result of denoising of the $k^{th}$ low frequency wavelet coefficient+g (the value of the $k^{th}$ low frequency wavelet coefficient the result of denoising of the $k^{th}$ low frequency wavelet coefficient), where y=g(x) is a detail preservation intensity function, x indicates a difference between the value of the $k^{th}$ low frequency wavelet coefficient and the result of denoising of the $k^{th}$ low frequency wavelet coefficient, and y indicates a value of a detail preservation intensity.

Detail restoration is performed on a denoised low frequency wavelet coefficient on each level using the detail preservation intensity function, to obtain a detail-restored low frequency wavelet coefficient on each level. A denoised low frequency wavelet coefficient can be adjusted, and more image detail information is preserved when denoising is performed.

With reference to Embodiment 4 or Embodiment 5, in another embodiment of the image denoising method provided by the present disclosure, the edge intensity of the pixel corresponding to the $j^{th}$ high frequency wavelet coefficient includes an edge intensity corresponding to the at least one component of the three components y, u, and v that correspond to the pixel corresponding to the $j^{th}$ high frequency wavelet coefficient.

Generally, because edge information of the chrominance components u and v is unstable and unobvious, the edge intensity of the pixel corresponding to the $j^{th}$ high frequency wavelet coefficient may not only include chrominance edge intensities (which are edge intensities corresponding to chrominance components) corresponding to the chrominance components u and v but also include a luminance edge intensity (which is an edge intensity corresponding to a luminance component) corresponding to the component y, that is, may be a sum of the edge intensities corresponding to the three components y, u, and v. In specific implementation, a largest value among the chrominance edge intensities and the luminance edge intensity of the pixel corresponding to the $j^{th}$ high frequency wavelet coefficient (that is, a largest value among the edge intensities corresponding to the three components y, u, and v) may be used as the edge intensity of the pixel corresponding to the $j^{th}$ high frequency wavelet coefficient, and in this case, the largest value is the edge intensity corresponding to one component of the three components y, u, and v. Optionally, the edge intensity or edge intensities corresponding to one or more components of the three components y, u, and v may be selected as the edge intensity of the pixel corresponding to the $j^{th}$ high frequency wavelet coefficient. For example, two larger edge intensities of the three components y, u, and v may be selected, and a sum of the two edge intensities is used as the edge intensity of the pixel corresponding to the $j^{th}$ high frequency wavelet coefficient.

Further, the edge intensity corresponding to the at least one component is an edge intensity based on the high frequency wavelet coefficient and the low frequency wavelet coefficient of the at least one component.

Exemplarily, for calculation of the luminance edge intensity, because both the high frequency wavelet coefficient and the low frequency wavelet coefficient of each component include edge information, edge intensities may be extracted for both the high frequency wavelet coefficient and the low frequency wavelet coefficient of each component (values of the edge intensities may be calculated using a classical Sobel operator, Laplace operator, and the like), and then a largest value among the edge intensities of the high frequency wavelet coefficient and the low frequency wavelet coefficient (which include edge intensities corresponding to high frequency wavelet coefficients HLj, LHj, and HHj, and a low frequency wavelet coefficient LLj) is used as the luminance edge intensity. For calculation of the chrominance edge intensity, edge intensities may be extracted for both the high frequency wavelet coefficient and the low frequency wavelet coefficient of each component, and then a largest value among the edge intensities of the high frequency wavelet coefficient and the low frequency wavelet coefficient is used as the chrominance edge intensity. In an actual operation, a high frequency wavelet coefficient of chrominance is generally very weak. Therefore, to reduce an amount of calculation, an edge intensity of only a low frequency part may be extracted as the chrominance edge intensity.

Further, the shrinkage function in the foregoing embodiment is further a wavelet threshold function, and includes at least one of the following: a hard threshold function and a soft threshold function. Furthermore, the shrinkage function may be a hard threshold function, a soft threshold function, a shrinkage function that combines a hard threshold and a soft threshold, or the like.

Further, at least one direction in the foregoing embodiment includes at least one of the following: from left to right, from right to left, from top to bottom, and from bottom to top. Furthermore, recursive denoising may be performed on a low frequency wavelet coefficient on each level in the foregoing four directions, to obtain a denoised low frequency wavelet coefficient on the level. By performing recursive denoising in the four directions, symmetry of a denoising effect may be ensured, a denoising effect of an image is improved, and quality of the image is ensured.

From the perspective of a form, recursive denoising is performed on each low frequency wavelet coefficient using information only about four low frequency wavelet coefficients that are above, under, on the left of, and on the right of the low frequency wavelet coefficient in the four directions. However, performing recursive denoising on each low frequency wavelet coefficient is equivalent to indirectly using information about an entire image, which is equivalent to increasing a size of a window for filtering. Therefore, a large area of noise may be well eliminated, calculation complexity is low, a denoising effect is ensured, and denoising efficiency is improved.

In the following, a specific embodiment of the present disclosure is described using an example in which 3-level wavelet decomposition (that is, n=3) is performed on an image. An example in which color noise denoising is mainly performed on the image is used. Because color noise denoising may involve processing only of the components u and v, and processes of processing of the components u and v may be the same or similar, description is made in the following using processing of the component u as an example. For processing of the component v, reference may be made to the following process.

Figure 3:
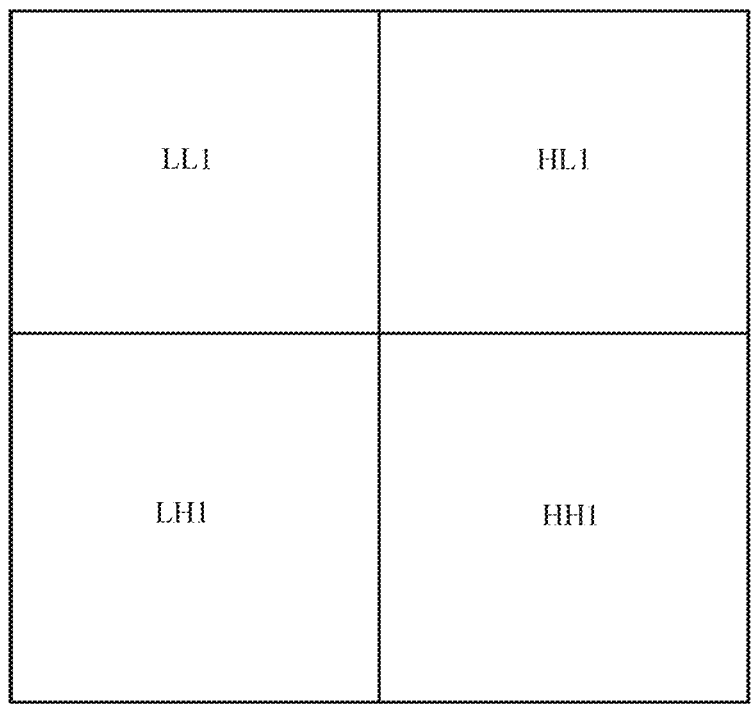
FIG. 3 is a schematic diagram of performing 1-level wavelet decomposition on an image in an image denoising method according to an embodiment of the present disclosure.
Figure 4:
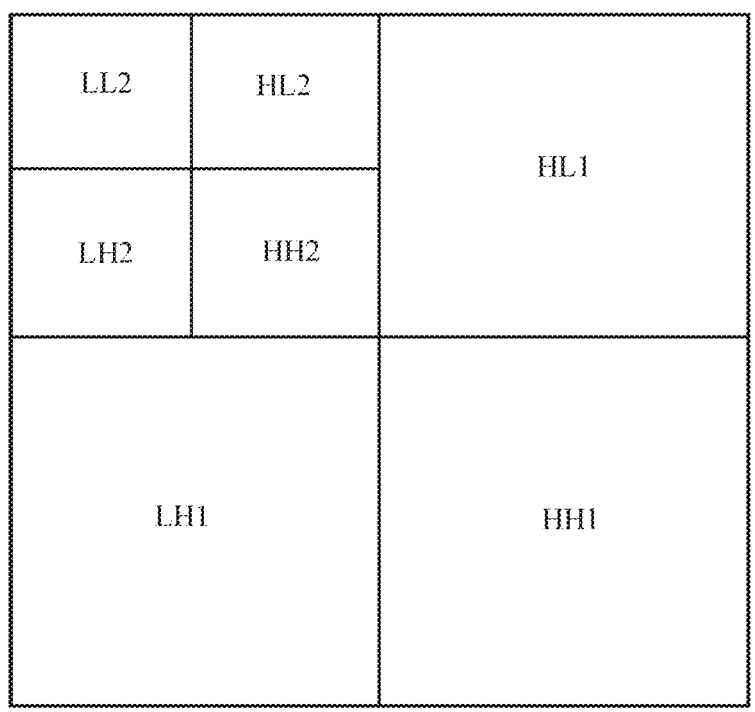
FIG. 4 is a schematic diagram of performing 2-level wavelet decomposition on an image in an image denoising method according to an embodiment of the present disclosure.
Figure 5:
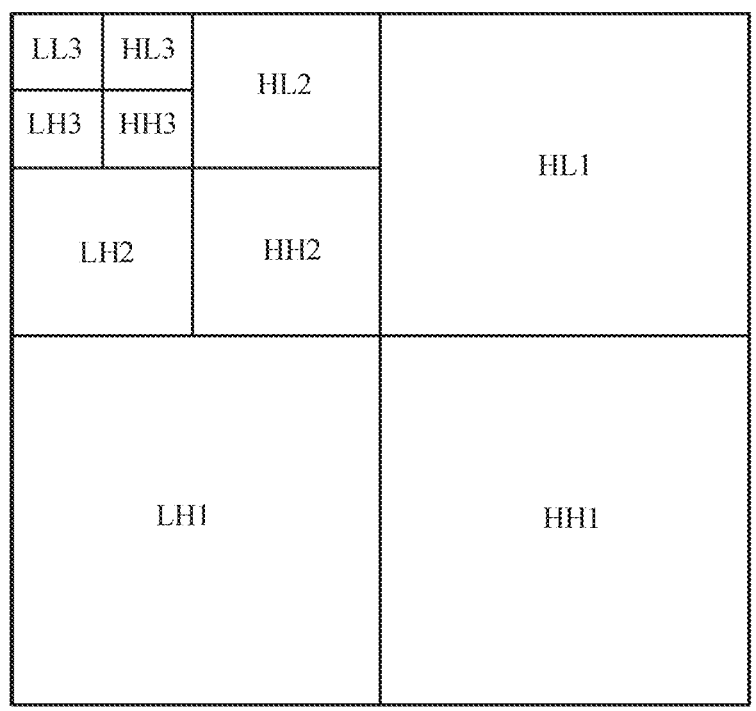
FIG. 5 is a schematic diagram of performing 3-level wavelet decomposition on an image in an image denoising method according to an embodiment of the present disclosure.

Step 1: Perform 3-level wavelet decomposition on the chrominance component u of the image, to obtain a low frequency wavelet coefficient LL1 on a first level and high frequency wavelet coefficients HL1, LH1, and HH1 on the first level, referring to FIG. 3, to obtain a low frequency wavelet coefficient LL2 on a second level and high frequency wavelet coefficients HL2, LH2, and HH2 on the second level, referring to FIG. 4, and to obtain a low frequency wavelet coefficient LL3 on a third level and high frequency wavelet coefficients HL3, LH3, and HH3 on the second level, referring to FIG. 5.

Step 2: Perform recursive denoising on the low frequency wavelet coefficient LL3 on a highest level of wavelet decomposition (which is the third level in this embodiment) in four directions.

(1) First Time: Recursive Denoising from Left to Right

In the direction from left to right, for each low frequency wavelet coefficient in each row, a recursive operation is performed from left to right by referring to a value of a reference point on the left of the low frequency wavelet coefficient and according to a denoising intensity function y=f(x). A specific rule may be as follows. For a first low frequency wavelet coefficient in the row: a result of denoising of the first low frequency wavelet coefficient=a value of the low frequency wavelet coefficient for another low frequency wavelet coefficient in the row: a value of a reference point=a result of denoising of a low frequency wavelet coefficient on the left of the low frequency wavelet coefficient a result of denoising of the low frequency wavelet coefficient=a value of the low frequency wavelet coefficient+f(the value of the reference point−the value of the low frequency wavelet coefficient)

That is, in one direction, the result of denoising of the first low frequency wavelet coefficient is the value of the low frequency wavelet coefficient, and a result of denoising of the $k^{th}$ low frequency wavelet coefficient=a value of the $k^{th}$ low frequency wavelet coefficient+f(a result of denoising of the $(k-1)^{th}$ low frequency wavelet coefficient the value of the $k^{th}$ low frequency wavelet coefficient), where k>1, and k is an integer, where y=f(x) is the denoising intensity function, x indicates a difference between the result of denoising of the $(k-1)^{th}$ low frequency wavelet coefficient and the $k^{th}$ low frequency wavelet coefficient, and y indicates a denoising intensity. The denoising intensity function is a function determined according to the estimated noise level of the image and/or a setting of a user for the function.

$y=f(x)$ may be a denoising intensity function curve that is shown as a solid line in FIG. 6. The horizontal axis (x axis) indicates a difference between a value of a reference point and a low frequency wavelet coefficient, and the vertical axis (y axis) indicates a denoising intensity. Several denoising intensities, that is, different denoising grades, of the image may be obtained based on a predetermined rule according to an estimated noise level of the image, or a system presets or a user sets different denoising grades. A location of a peak value point (a location of a maximum denoising intensity) may be obtained according to the estimated noise level of the image and/or a setting of the user for the function, and amplitude of the peak value point may be freely set by the user or may be preset by a device. For example, by estimating a noise level of the image, because a location of maximum noise corresponds to a peak value of a denoising intensity, a location of a peak value point of the denoising intensity function curve (that is, an x value corresponding to the peak value point) may be determined according to the location of the maximum noise. Certainly, the location of the peak value point of the function $y=f(x)$ may also be obtained with reference to the estimated noise level of the image and the setting of the user for the function, or only according to the setting of the user for the function (for example, the user chooses to focus on a part, which the user is interested in, of the image during denoising, or the user chooses to focus on a part, which the user believes to have relatively large noise, of the image according to visual perception of the user during denoising). Amplitude of the peak value point of the function $y=f(x)$, namely, the maximum denoising intensity, may be freely set by the user or may be preset by the device. For example, when the method is implemented on a device, the device may set amplitude of the peak value point according to a predetermined rule. Certainly, if a denoising effect does not reach an expectation of the user, the user may also adjust the amplitude of the peak value point by setting.

In the denoising intensity function curve, that x is closer to two ends (which indicates that an edge is stronger) indicates that y is closer to 0, and therefore, the result of denoising of the low frequency wavelet coefficient is closer to an original value of the low frequency wavelet coefficient, and edge preservation is better, that x is closer to the location of the peak value point indicates that y is larger, and therefore, the result of denoising of the low frequency wavelet coefficient is closer to the reference point, and the denoising intensity is higher.

$y=f(x)$ may be stored in a memory in a form of a lookup table (LUT), and calculation of $y=f(x)$ is converted into a LUT operation, which can increase a speed of an algorithm.

(2) Second Time: Recursive Denoising from Top to Bottom

In the direction from top to bottom, for each low frequency wavelet coefficient in each column, a recursive operation is performed from top to bottom by referring to a value of a reference point above the low frequency wavelet coefficient and according to the denoising intensity function $y=f(x)$. A specific rule may be similar to that of the recursive operation of the first time.

(3) Third Time: Recursive Denoising from Right to Left

In the direction from right to left, for each low frequency wavelet coefficient in each row, a recursive operation is performed from right to left by referring to a value of a reference point on the right of the low frequency wavelet coefficient and according to the denoising intensity function $y=f(x)$. A specific rule may be similar to that of the recursive operation of the first time.

(4) Fourth Time: Recursive Denoising from Bottom to Top

In the direction from bottom to top, for each low frequency wavelet coefficient in each column, a recursive operation is performed from bottom to top by referring to a value of a reference point under the low frequency wavelet coefficient and according to the denoising intensity function $y=f(x)$. A specific rule may be similar to that of the recursive operation of the first time.

In the foregoing (1), (2), (3) and (4), recursive denoising is performed on the low frequency wavelet coefficient LL3 on the third level of wavelet decomposition of the image in four different directions separately, to obtain a denoised low frequency wavelet coefficient on the third level. An order in which recursive denoising is performed in the foregoing four directions (that is, an order in which recursive denoising is performed for the first to the fourth time) may be adjusted according to a requirement, and is not limited in the present disclosure, and only one case is provided as an example in this embodiment of the present disclosure. The embodiment of the present disclosure illustrates recursive denoising in four directions, and a quantity of directions may vary according to requirement. For example, recursive denoising may be performed in only two directions (for example, two symmetrical directions: from left to right and from right to left), or may be performed in more directions. For example, four directions may also be formed in a diagonal direction, which are from lower left to upper right, from upper right to lower left, from upper left to lower right, and from lower right to upper left.

After the four operations from (1), (2), (3) and (4) are performed, from the perspective of a form, denoising filtering is performed on each low frequency wavelet coefficient using information only about four low frequency wavelet coefficients that are above, under, on the left of, and on the right of the low frequency wavelet coefficient. However, information about an entire image is indirectly used actually, which is equivalent to increasing a size of a window for filtering. Therefore, a large area of sheet-like color noise existing in the image can be well eliminated, and calculation complexity is low.

Optionally, after the foregoing recursive denoising is performed on the low frequency wavelet coefficient LL3 on the third level of wavelet decomposition of the image, detail restoration may further be performed on the obtained denoised low frequency wavelet coefficient on the third level with reference to an original low frequency wavelet coefficient on the third level of the image and a detail preservation intensity function. Details are as follows.

(5) Fifth Time: Detail Restoration with Reference to the Original Low Frequency Wavelet Coefficient of the Image.

After recursive denoising is performed on the $k^{th}$ low frequency wavelet coefficient, detail restoration is performed on the $k^{th}$ low frequency wavelet coefficient according to the following formula a result of detail restoration of the $k^{th}$ low frequency wavelet coefficient=the result of denoising of the $k^{th}$ low frequency wavelet coefficient+g (the value of the $k^{th}$ low frequency wavelet coefficient the result of denoising of the $k^{th}$ low frequency wavelet coefficient), where $y=g(x)$ is the detail preservation intensity function, x indicates a difference between the value of the $k^{th}$ low frequency wavelet coefficient and the result of denoising of the $k^{th}$ low frequency wavelet coefficient, and y indicates a value of a detail preservation intensity.

y=g(x) may be a detail preservation intensity function curve that is shown as a dashed line in FIG. 6. The horizontal axis (x axis) indicates a difference between the value of the $k^{th}$ low frequency wavelet coefficient of the image and the result of denoising of the $k^{th}$ low frequency wavelet coefficient, and the vertical axis (y axis) indicates the detail preservation intensity. Several detail preservation intensities, that is, different detail preservation grades, of the image may be obtained based on a predetermined rule according to an estimated noise level of the image, or the system presets or the user sets different detail preservation grades. The detail preservation intensity function is a function determined according to the denoising intensity function and/or a setting of the user for the function. For example, a location of a peak value point of the curve (a location of a maximum detail preservation intensity) may be obtained according to the estimated noise level of the image and/or the setting of the user for the function, and amplitude of the peak value point may be freely set by the user or may be preset by a device. For example, by estimating a noise level of the image, because a location of maximum noise corresponds to a peak value of a denoising intensity and more image details may be lost, a location of a peak value point of the detail preservation intensity function curve (that is, an x value corresponding to the peak value point) may be determined according to the location of the maximum noise. Certainly, the location of the peak value point of the function y=g(x) may also be obtained with reference to the estimated noise level of the image and the setting of the user for the function, or only according to the setting of the user for the function (for example, the user chooses to focus on a part, which the user is interested in, of the image during detail restoration, or the user chooses to focus on a part, which the user believes to have greater detail loss, of the image according to visual perception of the user during detail restoration). Amplitude of the peak value point of the function y=g(x), namely, the maximum detail preservation intensity, may be freely set by the user or may be preset by the device. For example, when the method is implemented on a device, the device may set amplitude of the peak value point according to a predetermined rule. The predetermined rule may be a predetermined quantity relationship with the amplitude of the peak value point of the function y=f(x), that is, the amplitude of the peak value point of the function y=g(x) may be determined according to the amplitude of the peak value point of the function y=f(x). As shown in FIG. 6, the amplitude of the peak value point of the function y=g(x) is approximately ½ the amplitude of the peak value point of the function y=f(x). Certainly, if a detail restoration effect does not reach an expectation of the user, the user may also adjust the amplitude of the peak value point of the function y=g(x) by setting.

Similarly, y=g(x) may also be stored in a memory in a form of an LUT, and calculation of y=g(x) is converted into a LUT operation in order to increase a speed of an algorithm.

Step 3: Perform shrinkage function denoising that is based on edge information, on the high frequency wavelet coefficients HL3, LH3, and HH3 on the third level.

The performing shrinkage function denoising that is based on edge information includes performing denoising on the high frequency wavelet coefficients on the level according to the following formula:

$$y_j = \alpha_j x_j + (1-\alpha_j) h(x_j),$$

where $j \geq 1$, and j is an integer, where $y_j$ is a value obtained after the $j^{th}$ high frequency wavelet coefficient is denoised, $x_j$ is a value of the $j^{th}$ high frequency wavelet coefficient, $h(x_j)$ is a shrinkage function about $x_j$, and $\alpha_j$ is an edge intensity coefficient corresponding to an edge intensity of a pixel corresponding to the $j^{th}$ high frequency wavelet coefficient, where $0 \leq \alpha_j \leq 1$. A larger edge intensity of the pixel indicates that $\alpha_j$ is closer to 1, and therefore, $y_j$ is closer to $x_j$, and edge preservation is better. A smaller edge intensity of the pixel indicates that $\alpha_j$ is closer to 0, and therefore, $y_j$ is closer to $h(x_j)$, and a denoising effect is better. $\alpha_j$ may be a value obtained after normalization processing is performed on the edge intensity of the pixel corresponding to the $j^{th}$ high frequency wavelet coefficient.

The edge intensity of the pixel corresponding to the $j^{th}$ high frequency wavelet coefficient may include an edge intensity corresponding to the at least one component of the three components y, u, and v that correspond to the pixel corresponding to the $j^{th}$ high frequency wavelet coefficient.

For example, in an embodiment of the present disclosure, edge information of the chrominance components u and v may be unstable or unobvious. In this case, the edge intensity of the pixel corresponding to the $j^{th}$ high frequency wavelet coefficient may not only include chrominance edge intensities (which are edge intensities corresponding to chrominance components) corresponding to the chrominance components u and v but also include a luminance edge intensity (which is an edge intensity corresponding to a luminance component) corresponding to the component y, that is, may be a sum of the edge intensities corresponding to the three components y, u, and v. In specific implementation, a largest value among the chrominance edge intensities and the luminance edge intensity of the pixel corresponding to the $j^{th}$ high frequency wavelet coefficient (that is, a largest value among the edge intensities corresponding to the three components y, u, and v) may be used as the edge intensity of the pixel corresponding to the $j^{th}$ high frequency wavelet coefficient, and in this case, the largest value is the edge intensity corresponding to one component of the three components y, u, and v. Optionally, the edge intensity or edge intensities corresponding to one or more components of the three components y, u, and v may be selected as the edge intensity of the pixel corresponding to the $j^{th}$ high frequency wavelet coefficient. For example, two larger edge intensities of the three components y, u, and v may be selected, and a sum of the two edge intensities is used as the edge intensity of the pixel corresponding to the $j^{th}$ high frequency wavelet coefficient. In this embodiment, when denoising is performed on a high frequency wavelet coefficient of an image, reference is made to edge information of luminance and chrominance. Therefore, detail information of the image can still be well preserved while high frequency noise is filtered out.

Optionally, the edge intensity corresponding to the at least one component may be an edge intensity based on the high frequency wavelet coefficient and the low frequency wavelet coefficient of the at least one component. For a component, both a high frequency wavelet coefficient and a low frequency wavelet coefficient of the component include edge information, edge intensities may be extracted for both the high frequency wavelet coefficient and the low frequency wavelet coefficient, and an edge intensity corresponding to the component is obtained based on the edge intensities of the high frequency wavelet coefficient and the low frequency wavelet coefficient. For example, for calculation of a luminance edge intensity, because both the high frequency wavelet coefficient and the low frequency wavelet coefficient of the component include the edge information, the edge intensities may be extracted for both the high frequency wavelet coefficient and the low frequency wavelet coefficient (values of the edge intensities may be calculated using a classical Sobel operator, Laplace operator, and the like), and then a largest value among the edge intensities of the high frequency wavelet coefficient and the low frequency wavelet coefficient (which include edge intensities corresponding to high frequency wavelet coefficients HLm, LHm, and HHm, and a low frequency wavelet coefficient LLm, where m refers to a level number corresponding to a wavelet coefficient, and in this embodiment of the present disclosure, for the third level, a value of m is 3) is used as the luminance edge intensity. Optionally, for calculation of the chrominance edge intensity (edge intensity corresponding to u or v), the edge intensities may be extracted for both the high frequency wavelet coefficient and the low frequency wavelet coefficient of the component, and then a largest value among the edge intensities of the high frequency wavelet coefficient and the low frequency wavelet coefficient is used as the chrominance edge intensity. A high frequency wavelet coefficient of a chrominance component is generally very weak. Therefore, an edge intensity of only a low frequency wavelet coefficient may be extracted in order to reduce an amount of calculation. In this embodiment, when denoising is performed on a high frequency wavelet coefficient of an image, reference is made to an edge intensity corresponding to at least one component, and when an edge intensity of one component is calculated, reference is made to a high frequency wavelet coefficient and a low frequency wavelet coefficient of the component. Therefore, more detail information of the image can be preserved while high frequency noise is filtered out.

The shrinkage function is further a wavelet threshold function, and may include at least one of the following: a hard threshold function and a soft threshold function. Furthermore, the shrinkage function may be a hard threshold function, a soft threshold function, a shrinkage function that combines a hard threshold and a soft threshold, or the like. In this embodiment, an example of a soft threshold function is used for processing. The following formula is a type of soft threshold function:

$$\eta_T(x) = \begin{cases} x - T, & x > T \\ 0, & |x| \le T \\ T + x, & x < -T \end{cases}$$

where T is a threshold, and for a threshold determining method, various existing methods may be used, which is not limited in this embodiment of the present disclosure.

For a high frequency wavelet coefficient of an image, soft threshold function denoising is performed with reference to edge intensities of luminance and chrominance of the image. In this way, when high frequency noise is filtered out, detail information of the image can still be well preserved.

Step 4: Perform wavelet reconstruction on the low frequency wavelet coefficient LL3 on the third level that is processed in step 2 and the high frequency wavelet coefficients HL3, LH3, and HH3 on the third level that are processed in step 3, to obtain a denoised low frequency wavelet coefficient LL2 on the second level (that is, the $(n-1)^{th}$ level).

Step 5: Perform an operation similar to that in step 2 on the denoised low frequency wavelet coefficient LL2 on the second level (that is, the $i^{th}$ level, where an initial value of i is n 1) in step 4, to obtain a twice-denoised low frequency wavelet coefficient LL2 on the second level (Note: because LL3 and LL2 represent information of different scales (levels) and different frequencies, denoising may be separately performed for different scales and different frequencies), and perform an operation similar to that in step 3 on the high frequency wavelet coefficients HL2, LH2, and HH2 on the second level, to obtain denoised high frequency wavelet coefficients HL2, LH2, and HH2 on the second level.

In this case, a value of i is 2, that is, i>1, and wavelet reconstruction is performed on LL2, HL2, LH2, and HH2 that are denoised in step 5, to obtain a denoised low frequency wavelet coefficient LL1 on the first level (that is, the $(i-1)^{th}$ level).

Step 6: Perform an operation similar to that in step 2 on the denoised low frequency wavelet coefficient LL1 on the first level in step 5, to obtain a twice-denoised low frequency wavelet coefficient LL1 on the first level, and perform an operation similar to that in step 3 on the high frequency wavelet coefficients HL1, LH1, and HH1 on the first level, to obtain denoised high frequency wavelet coefficients HL1, LH1, and HH1 on the first level.

The foregoing step is equivalent to assigning a value to i so that i=i−1 after step 5 is completed. In this case, the value of i being 1 is substituted into step 2 and step 3. After step 2 and step 3 are completed, the value of i is 1. When i=1, wavelet reconstruction is performed according to the twice-denoised low frequency wavelet coefficient on the $i^{th}$ level and a high frequency wavelet coefficient on the $i^{th}$ level, and a denoised component may be obtained. That is, wavelet reconstruction is performed on LL1, HL1, LH1, and HH1 that are denoised in step 6, and a denoised chrominance component u is obtained.

The component v may be processed with reference to the foregoing step 1 to step 6, and a denoised chrominance component v is obtained.

The luminance component is combined with the foregoing denoised chrominance components, and an image from which color noise has been eliminated is obtained. FIG. 7A and FIG. 7B respectively show an original image including noise and an image from which color noise is eliminated. It can be seen that a car in the original image is grey, but FIG. 7A includes a large amount of color noise such as red, blue, and green, and the car looks colorful. However, in FIG. 7B, because the color noise is eliminated, the image is clearer.

Further, optionally, in another embodiment of the present disclosure, denoising processing may be performed on the luminance component y with reference to the foregoing step 1 to step 6, and in this case, luminance noise is eliminated. A denoised luminance component is combined with the denoised chrominance components, and an image from which luminance noise and color noise are eliminated can be obtained. As shown in FIG. 7C, it can be seen that noise is eliminated from the image and details are well preserved.

It should be noted that, when different components are processed, involved functions that include y=f(x), y=g(x), a shrinkage function, and the like may be the same or may be different. Methods for determining these functions may be the same or may be different, and adjustment may be performed according to a requirement, which is not limited in the present disclosure.

The image denoising method provided in the foregoing embodiments may be applied to denoising processing performed on an image when a terminal photographs an image, and can improve quality of the photographed image and user experience.

Figure 8:
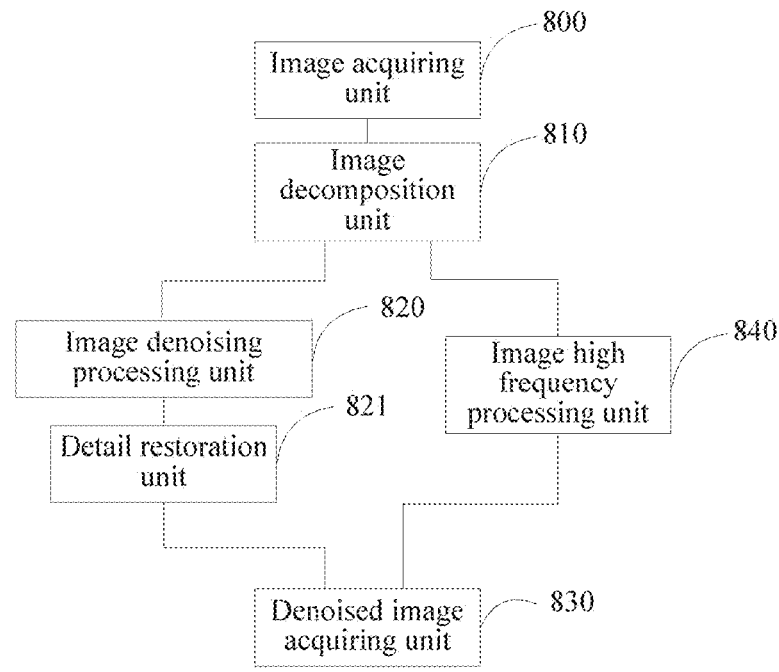
FIG. 8 is a schematic diagram of a structure of an image denoising terminal according to an embodiment of the present disclosure.

An embodiment of the present disclosure further provides an image denoising terminal. FIG. 8 shows an embodiment of the terminal provided by the present disclosure. In this embodiment, the terminal includes an image acquiring unit 800 configured to acquire image data of an image, an image decomposition unit 810 configured to perform wavelet decomposition on at least one component of three components of the image data: a luminance component y and chrominance components u and v, to obtain a high frequency wavelet coefficient and a low frequency wavelet coefficient of each component, where y is luminance of the image, and u and v are chrominance of the image, an image denoising processing unit 820 configured to perform recursive denoising on the low frequency wavelet coefficient of each component, to obtain a denoised low frequency wavelet coefficient of each component, and perform wavelet reconstruction according to the high frequency wavelet coefficient of each component and the denoised low frequency wavelet coefficient of each component, to obtain at least one denoised component, and a denoised image acquiring unit 830 configured to combine the three denoised components to obtain denoised image data when at least one denoised component is three components, or combine the at least one denoised component with the other one or two components of the three components to obtain the denoised image data when at least one denoised component is one or two components.

In an embodiment of the terminal provided by the present disclosure, the terminal further includes an image high frequency processing unit 840 configured to perform shrinkage function denoising on the high frequency wavelet coefficient of each component based on edge information, which includes performing denoising on the high frequency wavelet coefficient of each component according to the following formula:

$$y=\alpha x+(1-\alpha)h(x),$$

where $\alpha$ is a parameter related to an edge intensity, and $h(x)$ is a shrinkage function about x.

The image denoising processing unit 820 being configured to perform wavelet reconstruction according to the high frequency wavelet coefficient of each component and the denoised low frequency wavelet coefficient of each component, to obtain at least one denoised component is being configured to perform wavelet reconstruction according to a denoised high frequency wavelet coefficient of each component and the denoised low frequency wavelet coefficient of each component, to obtain the at least one denoised component.

In an embodiment of the terminal provided by the present disclosure, the image decomposition unit 810 is further configured to perform n-level wavelet decomposition on at least one component of the three components of the image data: the luminance component y and the chrominance components u and v, to obtain n levels of high frequency wavelet coefficients and n levels of low frequency wavelet coefficients of each component, where n≥2, and n is an integer, and the image denoising processing unit 820 is further configured to perform the following processing on each component.

A: performing recursive denoising on a low frequency wavelet coefficient on the $n^{th}$ level, to obtain a denoised low frequency wavelet coefficient on the $n^{th}$ level, and performing wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level.

B: performing recursive denoising on a denoised low frequency wavelet coefficient on the $i^{th}$ level, to obtain a twice-denoised low frequency wavelet coefficient on the $i^{th}$ level, where 1≤i≤n−1, i is a variable, i is an integer, and an initial value of i is n−1, and C: when i>1, performing wavelet reconstruction according to the twice-denoised low frequency wavelet coefficient on the $i^{th}$ level and a high frequency wavelet coefficient on the $i^{th}$ level, to obtain a denoised low frequency wavelet coefficient on the $(i-1)^{th}$ level, assigning a value to i so that i=i−1, and returning to step B, or when i=1, performing wavelet reconstruction according to the twice-denoised low frequency wavelet coefficient on the $i^{th}$ level and a high frequency wavelet coefficient on the $i^{th}$ level, to obtain a denoised component.

In an embodiment of the terminal provided by the present disclosure, the terminal further includes an image high frequency processing unit 840 configured to perform shrinkage function denoising on the high frequency wavelet coefficient of each component based on edge information, which includes performing denoising on a high frequency wavelet coefficient on each level of the n levels of each component according to the following formula:

$$y_j=\alpha_j x_j+(1-\alpha_j)h(x_j),$$

where j≥1, and j is an integer, where $y_j$ is a value obtained after the $j^{th}$ high frequency wavelet coefficient is denoised, $x_j$ is a value of the $j^{th}$ high frequency wavelet coefficient, $h(x_j)$ is a shrinkage function about $x_j$, and $\alpha_j$ is an edge intensity coefficient corresponding to an edge intensity of a pixel corresponding to the $j^{th}$ high frequency wavelet coefficient, where 0≤$\alpha_j$≤1.

In an embodiment of the terminal provided by the present disclosure, the image denoising processing unit 820 being configured to perform wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level is further being configured to perform wavelet reconstruction according to the denoised low frequency wavelet coefficient on the $n^{th}$ level and a denoised high frequency wavelet coefficient on the $n^{th}$ level, to obtain the denoised low frequency wavelet coefficient on the $(n-1)^{th}$ level, and the image denoising processing unit 820 being configured to perform wavelet reconstruction according to the twice-denoised low frequency wavelet coefficient on the $i^{th}$ level and a high frequency wavelet coefficient on the $i^{th}$ level is further being configured to perform wavelet reconstruction according to the twice-denoised low frequency wavelet coefficient on the $i^{th}$ level and a denoised high frequency wavelet coefficient on the $i^{th}$ level.

In an embodiment of the terminal provided by the present disclosure, the recursive denoising includes in at least one direction, a result of denoising of the $k^{th}$ low frequency wavelet coefficient=a value of the $k^{th}$ low frequency wavelet coefficient+f (a result of denoising of the $(k-1)^{th}$ low frequency wavelet coefficient the value of the $k^{th}$ low frequency wavelet coefficient), where k>1, and k is an integer, where y=f(x) is a denoising intensity function, x indicates a difference between the result of denoising of the $(k-1)^{th}$ low frequency wavelet coefficient and the $k^{th}$ low frequency wavelet coefficient, and y indicates a denoising intensity.

In an embodiment of the terminal provided by the present disclosure, the terminal further includes a detail restoration unit 821 configured to, after the image denoising processing unit 820 performs recursive denoising on the $k^{th}$ low frequency wavelet coefficient, perform detail restoration on the $k^{th}$ low frequency wavelet coefficient according to the following formula: a result of detail restoration of the $k^{th}$ low frequency wavelet coefficient=the result of denoising of the $k^{th}$ low frequency wavelet coefficient+g (the value of the $k^{th}$ low frequency wavelet coefficient the result of denoising of the $k^{th}$ low frequency wavelet coefficient), where y=g(x) is a detail preservation intensity function, x indicates a difference between the value of the $k^{th}$ low frequency wavelet coefficient and the result of denoising of the $k^{th}$ low frequency wavelet coefficient, and y indicates a value of a detail preservation intensity.

In an embodiment of the terminal provided by the present disclosure, the edge intensity of the pixel corresponding to the $j^{th}$ high frequency wavelet coefficient includes an edge intensity corresponding to at least one component of the three components y, u, and v that correspond to the pixel corresponding to the $j^{th}$ high frequency wavelet coefficient.

In an embodiment of the terminal provided by the present disclosure, the edge intensity corresponding to at least one component is an edge intensity based on the high frequency wavelet coefficient and the low frequency wavelet coefficient of at least one component.

In an embodiment of the terminal provided by the present disclosure, the shrinkage function is a wavelet threshold function, and includes at least one of the following: a hard threshold function and a soft threshold function.

In an embodiment of the terminal provided by the present disclosure, the at least one direction includes at least one of the following: from left to right, from right to left, from top to bottom, and from bottom to top.

For steps performed by units in the embodiments of the terminal provided by the present disclosure and specific content of the steps, reference may be made to related parts in the foregoing method embodiments, and details are not provided herein again.

Figure 9:
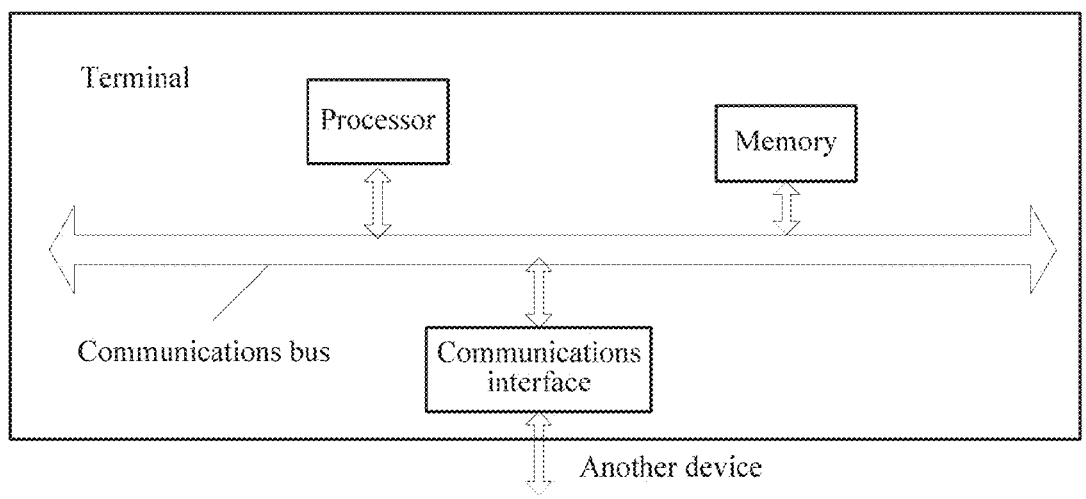
FIG. 9 is another schematic diagram of a structure of an image denoising terminal according to an embodiment of the present disclosure.

An embodiment of the present disclosure further provides an image denoising terminal. FIG. 9 shows an embodiment of the terminal provided by the present disclosure. In this embodiment, the terminal includes a memory, a processor, and a communications bus, and the processor is connected to the memory using the communications bus. The terminal may further include a communications interface, and a communication connection is established between the terminal and another device (such as another terminal or an access point device) using the communications interface.

There may be one or more memories, which are configured to store image data acquired by the terminal, and store an instruction for implementing the image denoising method, where the image data and the instruction may be stored in a same memory or stored in different memories.

There may be one or more processors, and when the one or more processors invoke the image data and the instruction for implementing the image denoising method that are stored in the one or more memories, the following steps may be performed on the image data: performing wavelet decomposition on at least one component of three components of the image data: a luminance component y and chrominance components u and v, to obtain a high frequency wavelet coefficient and a low frequency wavelet coefficient of each component, performing recursive denoising on the low frequency wavelet coefficient of each component, to obtain a denoised low frequency wavelet coefficient of each component, performing wavelet reconstruction according to the high frequency wavelet coefficient of each component and the denoised low frequency wavelet coefficient of each component, to obtain at least one denoised component, and combining the three denoised components, to obtain denoised image data when at least one denoised component is three components, or combining at least one denoised component with the other one or two components of the three components, to obtain denoised image data when the at least one denoised component is one or two components.

When the one or more processors invoke the image data and the instruction for implementing the image denoising method, one processor may invoke the image data and the instruction, or the image data and the instruction may be separately invoked by different processors.

In an embodiment of the terminal provided by the present disclosure, when the processor invokes the image data and the instruction for implementing the image denoising method that are stored in the one or more memories, the following steps may further be performed on the image data: performing shrinkage function denoising on the high frequency wavelet coefficient of each component based on edge information, where the performing shrinkage function denoising on the high frequency wavelet coefficient of each component based on edge information includes performing denoising on the high frequency wavelet coefficient of each component according to the following formula:

$$y=\alpha x+(1-\alpha)h(x),$$

where $\alpha$ is a parameter related to an edge intensity, and h(x) is a shrinkage function about x, and performing, by the processor, wavelet reconstruction according to the high frequency wavelet coefficient of each component and the denoised low frequency wavelet coefficient of each component, to obtain at least one denoised component is performing wavelet reconstruction according to a denoised high frequency wavelet coefficient of each component and the denoised low frequency wavelet coefficient of each component, to obtain at least one denoised component.

In an embodiment of the terminal provided by the present disclosure, performing, by the processor, wavelet decomposition on at least one component of three components of the image data: a luminance component y and chrominance components u and v, to obtain a high frequency wavelet coefficient and a low frequency wavelet coefficient of each component includes performing n-level wavelet decomposition on at least one component of the three components of the image data: the luminance component y and the chrominance components u and v, to obtain n levels of high frequency wavelet coefficients and n levels of low frequency wavelet coefficients of each component, where n≥2, and n is an integer, and the performing recursive denoising on the low frequency wavelet coefficient of each component, to obtain a denoised low frequency wavelet coefficient of each component, and the performing wavelet reconstruction according to the high frequency wavelet coefficient of each component and the denoised low frequency wavelet coefficient of each component, to obtain at least one denoised component include performing the following processing on each component.

A: performing recursive denoising on a low frequency wavelet coefficient on the $n^{th}$ level, to obtain a denoised low frequency wavelet coefficient on the $n^{th}$ level, and performing wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level.

B: performing recursive denoising on a denoised low frequency wavelet coefficient on the $i^{th}$ level, to obtain a twice-denoised low frequency wavelet coefficient on the $i^{th}$ level, where 1≤i≤n−1, i is a variable, i is an integer, and an initial value of i is n−1.

C: when i>1, performing wavelet reconstruction according to the twice-denoised low frequency wavelet coefficient on the $i^{th}$ level and a high frequency wavelet coefficient on the $i^{th}$ level, to obtain a denoised low frequency wavelet coefficient on the $(i-1)^{th}$ level, assigning a value to i so that i=i−1, and returning to step B, or when i=1, performing wavelet reconstruction according to the twice-denoised low frequency wavelet coefficient on the $i^{th}$ level and a high frequency wavelet coefficient on the $i^{th}$ level, to obtain a denoised component.

In an embodiment of the terminal provided by the present disclosure, performing, by the processor, shrinkage function denoising on the high frequency wavelet coefficient of each component based on edge information includes performing denoising on a high frequency wavelet coefficient on each level of the n levels of each component according to the following formula:

$$y_j = \alpha_j x_j + (1-\alpha_j)h(x_j),$$

where j≥1, and j is an integer, where $y_j$ is a value obtained after the $j^{th}$ high frequency wavelet coefficient is denoised, $x_j$ is a value of the $j^{th}$ high frequency wavelet coefficient, $h(x_j)$ is a shrinkage function about $x_j$, and $\alpha_j$ is an edge intensity coefficient corresponding to an edge intensity of a pixel corresponding to the $j^{th}$ high frequency wavelet coefficient, where $0 \le \alpha_j \le 1$.

In an embodiment of the terminal provided by the present disclosure, performing, by the processor, wavelet reconstruction according to the denoised low frequency wavelet coefficient on the $n^{th}$ level and a high frequency wavelet coefficient on the $n^{th}$ level, to obtain a denoised low frequency wavelet coefficient on the $(n-1)^{th}$ level is performing wavelet reconstruction according to the denoised low frequency wavelet coefficient on the $n^{th}$ level and a denoised high frequency wavelet coefficient on the $n^{th}$ level, to obtain the denoised low frequency wavelet coefficient on the $(n-1)^{th}$ level.

In an embodiment of the terminal provided by the present disclosure, performing, by the processor, wavelet reconstruction according to the twice-denoised low frequency wavelet coefficient on the $i^{th}$ level and a high frequency wavelet coefficient on the $i^{th}$ level is performing wavelet reconstruction according to the twice-denoised low frequency wavelet coefficient on the $i^{th}$ level and a denoised high frequency wavelet coefficient on the $i^{th}$ level.

In an embodiment of the terminal provided by the present disclosure, the recursive denoising includes in at least one direction, a result of denoising of the $k^{th}$ low frequency wavelet coefficient=a value of the $k^{th}$ low frequency wavelet coefficient+f (a result of denoising of the $(k-1)^{th}$ low frequency wavelet coefficient the value of the $k^{th}$ low frequency wavelet coefficient), where k>1, and k is an integer, where y=f(x) is a denoising intensity function, x indicates a difference between the result of denoising of the $(k-1)^{th}$ low frequency wavelet coefficient and the $k^{th}$ low frequency wavelet coefficient, and y indicates a denoising intensity.

In an embodiment of the terminal provided by the present disclosure, after performing recursive denoising on the $k^{th}$ low frequency wavelet coefficient, the processor may further perform detail restoration on the $k^{th}$ low frequency wavelet coefficient according to the following formula a result of detail restoration of the $k^{th}$ low frequency wavelet coefficient=the result of denoising of the $k^{th}$ low frequency wavelet coefficient+g (the value of the $k^{th}$ low frequency wavelet coefficient the result of denoising of the $k^{th}$ low frequency wavelet coefficient), where y=g(x) is a detail preservation intensity function, x indicates a difference between the value of the $k^{th}$ low frequency wavelet coefficient and the result of denoising of the $k^{th}$ low frequency wavelet coefficient, and y indicates a value of a detail preservation intensity.

In an embodiment of the terminal provided by the present disclosure, the edge intensity of the pixel corresponding to the $j^{th}$ high frequency wavelet coefficient includes an edge intensity corresponding to the at least one component of the three components y, u, and v that correspond to the pixel corresponding to the $j^{th}$ high frequency wavelet coefficient.

In an embodiment of the terminal provided by the present disclosure, the edge intensity corresponding to at least one component is an edge intensity based on the high frequency wavelet coefficient and the low frequency wavelet coefficient of at least one component.

In an embodiment of the terminal provided by the present disclosure, the shrinkage function is a wavelet threshold function, and includes at least one of the following: a hard threshold function and a soft threshold function.

In an embodiment of the terminal provided by the present disclosure, at least one direction includes at least one of the following: from left to right, from right to left, from top to bottom, and from bottom to top.

In the embodiments of the terminal provided by the present disclosure, when the processor invokes the image data and the instruction for implementing the image denoising method that are stored in one or more memories, for steps that can be performed on the image data and specific content of the steps, reference may be made to related parts in the foregoing method embodiments, and details are not provided herein again.

It should be further noted that in this specification, the terms "include", "comprise", or their any other variant is intended to cover a non-exclusive inclusion such that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

A person of ordinary skill in the art may understand that all or some of the steps of the methods in the embodiments may be completed by a program instructing relevant hardware. The program may be stored in a readable storage medium of a terminal. When the program runs, all or some of the foregoing steps are performed. Examples of the storage medium are FLASH, electrically erasable programmable read-only memory (EEPROM), and the like. The methods in the foregoing embodiments may also be implemented using a chip for image processing.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

In the foregoing specific implementation manners, the objectives, technical solutions, and benefits of the present disclosure are further described in detail. It should be understood that different embodiments may be combined, and the foregoing descriptions are merely specific implementation manners of the present disclosure, but are not intended to limit the protection scope of present disclosure. Any combination, modification, equivalent replacement, improvement, or the like made without departing from the spirit and principle of the present disclosure shall fall within the protection scope of the present disclosure.

What is claimed is:

1. An image denoising method, comprising:
    acquiring image data of an image;
    performing wavelet decomposition on at least one component of three components of the image data to obtain a high frequency wavelet coefficient and a low frequency wavelet coefficient of each component, wherein the three components of the image data comprises a luminance component y and chrominance components u and v;
    performing recursive denoising on the low frequency wavelet coefficient of each component to obtain a denoised low frequency wavelet coefficient of each component;
    performing wavelet reconstruction according to the high frequency wavelet coefficient of each component and the denoised low frequency wavelet coefficient of each component to obtain at least one denoised component;
    combining the three denoised components to obtain denoised image data when at least one denoised component is three components;
    combining at least one denoised component with the other one or two components of the three components to obtain denoised image data when at least one denoised component is one or two components; and
    performing shrinkage function denoising on the high frequency wavelet coefficient of each component based on edge information,
    wherein performing shrinkage function denoising on the high frequency wavelet coefficient of each component based on the edge information comprises performing denoising on the high frequency wavelet coefficient of each component according to the following formula;

$$y = \alpha x + (1-\alpha) h(x),$$

wherein $\alpha$ is a parameter related to an edge intensity wherein $h(x)$ is a shrinkage function about x, and
    wherein performing wavelet reconstruction according to the high frequency wavelet coefficient of each component and the denoised low frequency wavelet coefficient of each component to obtain at least one denoised component comprises performing wavelet reconstruction according to the denoised high frequency wavelet coefficient of each component and the denoised low frequency wavelet coefficient of each component to obtain at least one denoised component.

2. The method according to claim 1, wherein performing wavelet decomposition on at least one component of three components of the image data to obtain the high frequency wavelet coefficient and the low frequency wavelet coefficient of each component comprises performing n-level wavelet decomposition on at least one component of the three components of the image data to obtain n levels of high frequency wavelet coefficients and n levels of low frequency wavelet coefficients of each component, wherein n≥2, wherein n is an integer, wherein the three components of the image data comprises the luminance component y and the chrominance components u and v, wherein performing recursive denoising on the low frequency wavelet coefficient of each component- to obtain the denoised low frequency wavelet coefficient of each component and performing wavelet reconstruction according to the high frequency wavelet coefficient of each component and the denoised low frequency wavelet coefficient of each component to obtain at least one denoised component comprise performing the following processing on each component:
    A: performing recursive denoising on a low frequency wavelet coefficient on an $n^{th}$ level; to obtain a denoised low frequency wavelet coefficient on the $n^{th}$ level; and performing wavelet reconstruction according to the denoised low frequency wavelet coefficient on the $n^{th}$ level and a high frequency wavelet coefficient on the $n^{th}$ level to obtain a denoised low frequency wavelet coefficient on an $(n-1)^{th}$ level;
    B: performing recursive denoising on a denoised low frequency wavelet coefficient on an $i^{th}$ level to obtain a twice-denoised low frequency wavelet coefficient on the $i^{th}$ level, wherein 1≤i≤n−1, wherein i is a variable, wherein i is an integer, and wherein an initial value of i is n−1; and
    C: performing wavelet reconstruction according to the twice-denoised low frequency wavelet coefficient on the $i^{th}$ level and a high frequency wavelet coefficient on the $i^{th}$ level to obtain a denoised low frequency wavelet coefficient on an $(i-1)^{th}$ level when i>1; assigning a value to i such that i=i−1 when i>1; returning to step B when i>1; and performing wavelet reconstruction according to the twice-denoised low frequency wavelet coefficient on the $i^{th}$ level and the high frequency wavelet coefficient on the $i^{th}$ level to obtain a denoised component when i=1.

3. The method according to claim 2, further comprising performing shrinkage function denoising on the high frequency wavelet coefficient of each component based on the edge information, wherein performing shrinkage function denoising on the high frequency wavelet coefficient of each component based on edge information comprises performing denoising on a high frequency wavelet coefficient on each level of the n levels of each component according to the following formula:

$$y_j = \alpha_j x_j + (1-\alpha_j)h(x_j),$$

wherein $j \geq 1$, wherein j is an integer, wherein $y_j$ is a value obtained after a $j^{th}$ high frequency wavelet coefficient is denoised, wherein $x_j$ is a value of the $j^{th}$ high frequency wavelet coefficient, wherein $h(x_j)$ is a shrinkage function about $x_j$, wherein $\alpha_j$ is an edge intensity coefficient corresponding to an edge intensity of a pixel corresponding to the $j^{th}$ high frequency wavelet coefficient, and wherein $0 \leq \alpha_j \leq 1$.

4. The method according to claim 3, wherein performing wavelet reconstruction according to the denoised low frequency wavelet coefficient on the $n^{th}$ level and the high frequency wavelet coefficient on the $n^{th}$ level to obtain the denoised low frequency wavelet coefficient on the $(n-1)^{th}$ level comprises performing wavelet reconstruction according to the denoised low frequency wavelet coefficient on the $n^{th}$ level and a denoised high frequency wavelet coefficient on the $n^{th}$ level to obtain the denoised low frequency wavelet coefficient on the $(n-1)^{th}$ level, and wherein performing wavelet reconstruction according to the twice-denoised low frequency wavelet coefficient on the $i^{th}$ level and the high frequency wavelet coefficient on the $i^{th}$ level comprises performing wavelet reconstruction according to the twice-denoised low frequency wavelet coefficient on the $i^{th}$ level and a denoised high frequency wavelet coefficient on the $i^{th}$ level.

5. The method according to claim 3, wherein the edge intensity of the pixel corresponding to the $j^{th}$ high frequency wavelet coefficient comprises an edge intensity corresponding to at least one component of the three components y, u, and v that correspond to the pixel corresponding to the $j^{th}$ high frequency wavelet coefficient.

6. The method according to claim 5, wherein the edge intensity corresponding to at least one component is the edge intensity based on the high frequency wavelet coefficient and the low frequency wavelet coefficient of at least one component.

7. The method according to claim 1, wherein recursive denoising comprises in at least one direction, a result of denoising of a $k^{th}$ low frequency wavelet coefficient=a value of the $k^{th}$ low frequency wavelet coefficient+f(a result of denoising of a $(k-1)^{th}$ low frequency wavelet coefficient−the value of the $k^{th}$ low frequency wavelet coefficient), wherein k>1, wherein k is an integer, wherein y=f(x) is a denoising intensity function, wherein x indicates a difference between the result of denoising of the $(k-1)^{th}$ low frequency wavelet coefficient and the $k^{th}$ low frequency wavelet coefficient, and wherein y indicates a denoising intensity.

8. The method according to claim 7, wherein after recursive denoising is performed on the $k^{th}$ low frequency wavelet coefficient the method further comprises performing detail restoration on the $k^{th}$ low frequency wavelet coefficient according to the following formula:

a result of detail restoration of the $k^{th}$ low frequency wavelet coefficient=the result of denoising of the $k^{th}$ low frequency wavelet coefficient+g(the value of the $k^{th}$ low frequency wavelet coefficient−the result of denoising of the $k^{th}$ low frequency wavelet coefficient), wherein y=g(x) is a detail preservation intensity function, wherein x indicates a difference between the value of the $k^{th}$ low frequency wavelet coefficient and the result of denoising of the $k^{th}$ low frequency wavelet coefficient, and wherein y indicates a value of a detail preservation intensity.

9. The method according to claim 7, wherein the at least one direction comprises at least one of the following: from left to right, from right to left, from top to bottom, and from bottom to top.

10. The method according to claim 1, wherein the shrinkage function is a wavelet threshold function and comprises at least one of a hard threshold function and a soft threshold function.

11. An image denoising terminal, comprising:
a memory; and
a processor coupled to the memory and configured to:
  acquire image data of an image;
  perform wavelet decomposition on at least one component of three components of the image data to obtain a high frequency wavelet coefficient and a low frequency wavelet coefficient of each component, wherein the three components of the image data comprises a luminance component y and chrominance components u and v;
  perform recursive denoising on the low frequency wavelet coefficient of each component to obtain a denoised low frequency wavelet coefficient of each component;
  perform wavelet reconstruction according to the high frequency wavelet coefficient of each component and the denoised low frequency wavelet coefficient of each component, to obtain at least one denoised component;
  combine the three denoised components to obtain denoised image data when at least one denoised component is three components;
  combine at least one denoised component with the other one or two components of the three components to obtain denoised image data when at least one denoised component is one or two components;
  perform n-level wavelet decomposition on at least one component of the three components of the image data to obtain n levels of high frequency wavelet coefficients and n levels of low frequency wavelet coefficients of each component, wherein $n \geq 2$, wherein n is an integer, and wherein the three components of the image data comprises the luminance component y and the chrominance components u and v; and
perform the following processing on each component:
  A: perform recursive denoising on a low frequency wavelet coefficient on an $n^{th}$ level to obtain a denoised low frequency wavelet coefficient on the $n^{th}$ level; and perform wavelet reconstruction according to the denoised low frequency wavelet coefficient on the $n^{th}$ level and a high frequency wavelet coefficient on the $n^{th}$ level to obtain a denoised low frequency wavelet coefficient on an $(n-1)^{th}$ level;
  B: perform recursive denoising on a denoised low frequency wavelet coefficient on an $i^{th}$ level to obtain a twice-denoised low frequency wavelet coefficient on the $i^{th}$ level, wherein $1 \leq i \leq n-1$, wherein i is a variable, wherein i is an integer, and wherein an initial value of i is n−1; and
  C: perform wavelet reconstruction according to the twice-denoised low frequency wavelet coefficient on the $i^{th}$ level and a high frequency wavelet coefficient on the $i^{th}$ level to obtain a denoised low frequency wavelet coefficient on an $(i-1)^{th}$ level when i>1;

assign a value to i such that i=i−1 when i>1; return to step B when i>1; and perform wavelet reconstruction according to the twice-denoised low frequency wavelet coefficient on the $i^{th}$ level and the high frequency wavelet coefficient on the $i^{th}$ level to obtain a denoised component when i=1.

12. The terminal according to claim 11, wherein the processor is further configured to:
perform shrinkage function denoising on the high frequency wavelet coefficient of each component based on edge information, which comprises performing denoising on the high frequency wavelet coefficient of each component according to the following formula:

$$y=\alpha x+(1-\alpha)h(x),$$

wherein α is a parameter related to an edge intensity, wherein h(x) is a shrinkage function about x; and
perform wavelet reconstruction according to a denoised high frequency wavelet coefficient of each component and the denoised low frequency wavelet coefficient of each component, to obtain at least one denoised component.

13. The terminal according to claim 11, wherein the processor is further configured to perform shrinkage function denoising on the high frequency wavelet coefficient of each component based on the edge information, which comprises performing denoising on a high frequency wavelet coefficient on each level of the n levels of each component according to the following formula:

$$y_j=\alpha_j x_j+(1-\alpha_j)h(x_j),$$

wherein j≥1, wherein j is an integer, wherein $y_j$ is a value obtained after a $j^{th}$ high frequency wavelet coefficient is denoised, wherein $x_j$ is a value of the $j^{th}$ high frequency wavelet coefficient, wherein $h(x_j)$ is a shrinkage function about $x_j$, wherein $\alpha_j$ is an edge intensity coefficient corresponding to an edge intensity of a pixel corresponding to the $j^{th}$ high frequency wavelet coefficient, and wherein 0≤$\alpha_j$≤1.

14. The terminal according to claim 13, wherein the processor is further configured to:
perform wavelet reconstruction according to the denoised low frequency wavelet coefficient on the $n^{th}$ level and a denoised high frequency wavelet coefficient on the $n^{th}$ level to obtain the denoised low frequency wavelet coefficient on the $(n-1)^{th}$ level; and
perform wavelet reconstruction according to the twice-denoised low frequency wavelet coefficient on the $i^{th}$ level and a denoised high frequency wavelet coefficient on the $i^{th}$ level.

15. The terminal according to claim 13, wherein the edge intensity of the pixel corresponding to the $j^{th}$ high frequency wavelet coefficient comprises an edge intensity corresponding to at least one component of the three components y, u, and v that correspond to the pixel corresponding to the $j^{th}$ high frequency wavelet coefficient.

16. The terminal according to claim 15, wherein the edge intensity corresponding to at least one component is an edge intensity based on the high frequency wavelet coefficient and the low frequency wavelet coefficient of at least one component.

17. The terminal according to claim 11, wherein the recursive denoising comprises in at least one direction, a result of denoising of the $k^{th}$ low frequency wavelet coefficient=a value of the $k^{th}$ low frequency wavelet coefficient+f(a result of denoising of the $(k-1)^{th}$ low frequency wavelet coefficient−the value of the $k^{th}$ low frequency wavelet coefficient), wherein k>1, wherein k is an integer, wherein y=f(x) is a denoising intensity function, wherein x indicates a difference between the result of denoising of the $(k-1)^{th}$ low frequency wavelet coefficient and the $k^{th}$ low frequency wavelet coefficient, and wherein y indicates a denoising intensity.

18. The terminal according to claim 17, wherein after performing recursive denoising on the $k^{th}$ low frequency wavelet coefficient the processor is further configured to perform detail restoration on the $k^{th}$ low frequency wavelet coefficient according to the following formula:

a result of detail restoration of the $k^{th}$ low frequency wavelet coefficient=the result of denoising of the $k^{th}$ low frequency wavelet coefficient+g(the value of the $k^{th}$ low frequency wavelet coefficient−the result of denoising of the $k^{th}$ low frequency wavelet coefficient), wherein y=g(x) is a detail preservation intensity function, wherein x indicates a difference between the value of the $k^{th}$ low frequency wavelet coefficient and the result of denoising of the $k^{th}$ low frequency wavelet coefficient, and wherein y indicates a value of a detail preservation intensity.

19. An image denoising method, comprising:
acquiring image data of an image;
performing wavelet decomposition on at least one component of three components of the image data to obtain a high frequency wavelet coefficient and a low frequency wavelet coefficient of each component, wherein the three components of the image data comprises a luminance component y and chrominance components u and v;
performing recursive denoising on the low frequency wavelet coefficient of each component to obtain a denoised low frequency wavelet coefficient of each component;
performing wavelet reconstruction according to the high frequency wavelet coefficient of each component and the denoised low frequency wavelet coefficient of each component to obtain at least one denoised component;
combining the three denoised components to obtain denoised image data when at least one denoised component is three components; and
combining at least one denoised component with the other one or two components of the three components to obtain denoised image data when at least one denoised component is one or two components,
wherein recursive denoising comprises in at least one direction, a result of denoising of a $k^{th}$ low frequency wavelet coefficient=a value of the $k^{th}$ low frequency wavelet coefficient+f(a result of denoising of a $(k-1)^{th}$ low frequency wavelet coefficient−the value of the $k^{th}$ low frequency wavelet coefficient), wherein k>1, wherein k is an integer, wherein y=f(x) is a denoising intensity function, wherein x indicates a difference between the result of denoising of the $(k-1)^{th}$ low frequency wavelet coefficient and the $k^{th}$ low frequency wavelet coefficient, and wherein y indicates a denoising intensity.

* * * * *